(12) United States Patent
Wang et al.

(10) Patent No.: US 11,550,127 B2
(45) Date of Patent: Jan. 10, 2023

(54) OPTICAL IMAGING LENS ASSEMBLY

(71) Applicant: Zhejiang Sunny Optical Co., Ltd, Ningbo (CN)

(72) Inventors: Xin Wang, Ningbo (CN); Yabin Hu, Ningbo (CN); Fujian Dai, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 335 days.

(21) Appl. No.: 16/869,715

(22) Filed: May 8, 2020

(65) Prior Publication Data

US 2020/0371316 A1    Nov. 26, 2020

(30) Foreign Application Priority Data

May 21, 2019    (CN) .......................... 201910424422.4

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| | | | |
|---|---|---|---|
| 2004/0136088 A1* | 7/2004 | Ohashi | G02B 15/177 359/689 |
| 2017/0192200 A1 | 7/2017 | Hsieh et al. | |
| 2019/0056568 A1 | 2/2019 | Huang | |
| 2019/0121064 A1 | 4/2019 | Zhang et al. | |

OTHER PUBLICATIONS

Communication dated Jul. 30, 2021 by the Indian Patent Office in application No. 202044019058.

* cited by examiner

*Primary Examiner* — Joseph P Martinez
(74) *Attorney, Agent, or Firm* — Sughrue Mion, PLLC

(57) ABSTRACT

The present disclosure discloses an optical imaging lens assembly including a first lens, a second lens, a third lens, a fourth lens, a fifth lens, a sixth lens, a seventh lens and an eighth lens, each of which has refractive power. The first lens has a negative refractive power; the the third lens and the sixth lens each has a positive refractive power; an object-side surface of the fourth lens is convex, and an image-side surface thereof is concave; an object-side surface of the fifth lens is convex,and an image-side surface thereof is concave. A distance TTL along the optical axis from an object-side surface of the first lens to an imaging plane of the optical imaging lens assembly and half of a diagonal length ImgH of an effective pixel area on the imaging plane of the optical imaging lens assembly satisfy TTL/ImgH≤1.25.

18 Claims, 12 Drawing Sheets

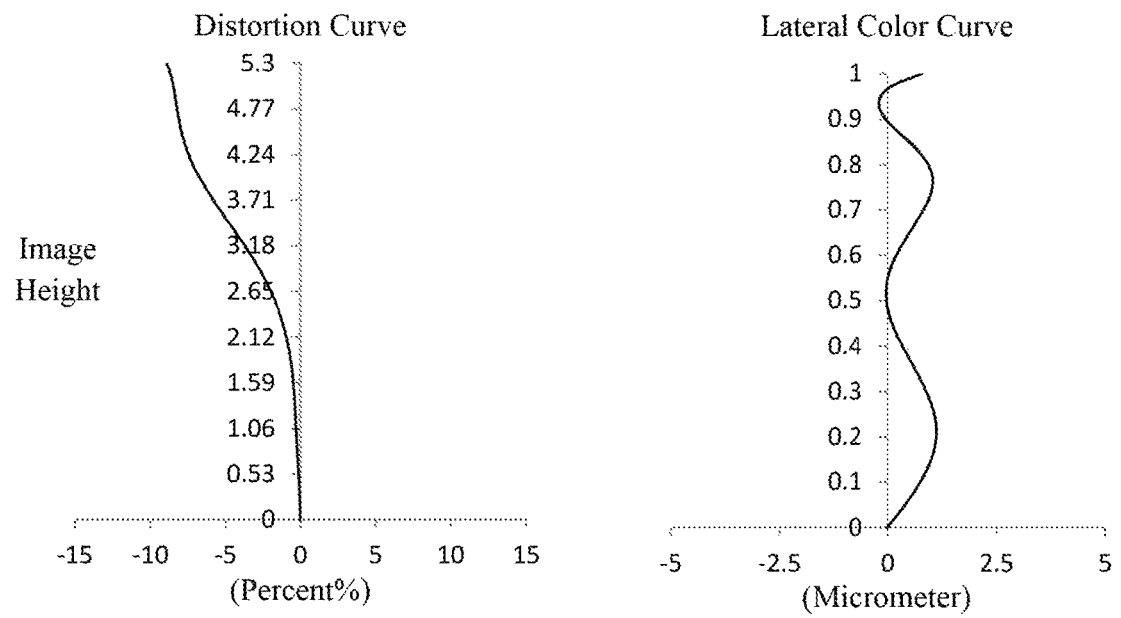
Fig. 2C
Fig. 2D
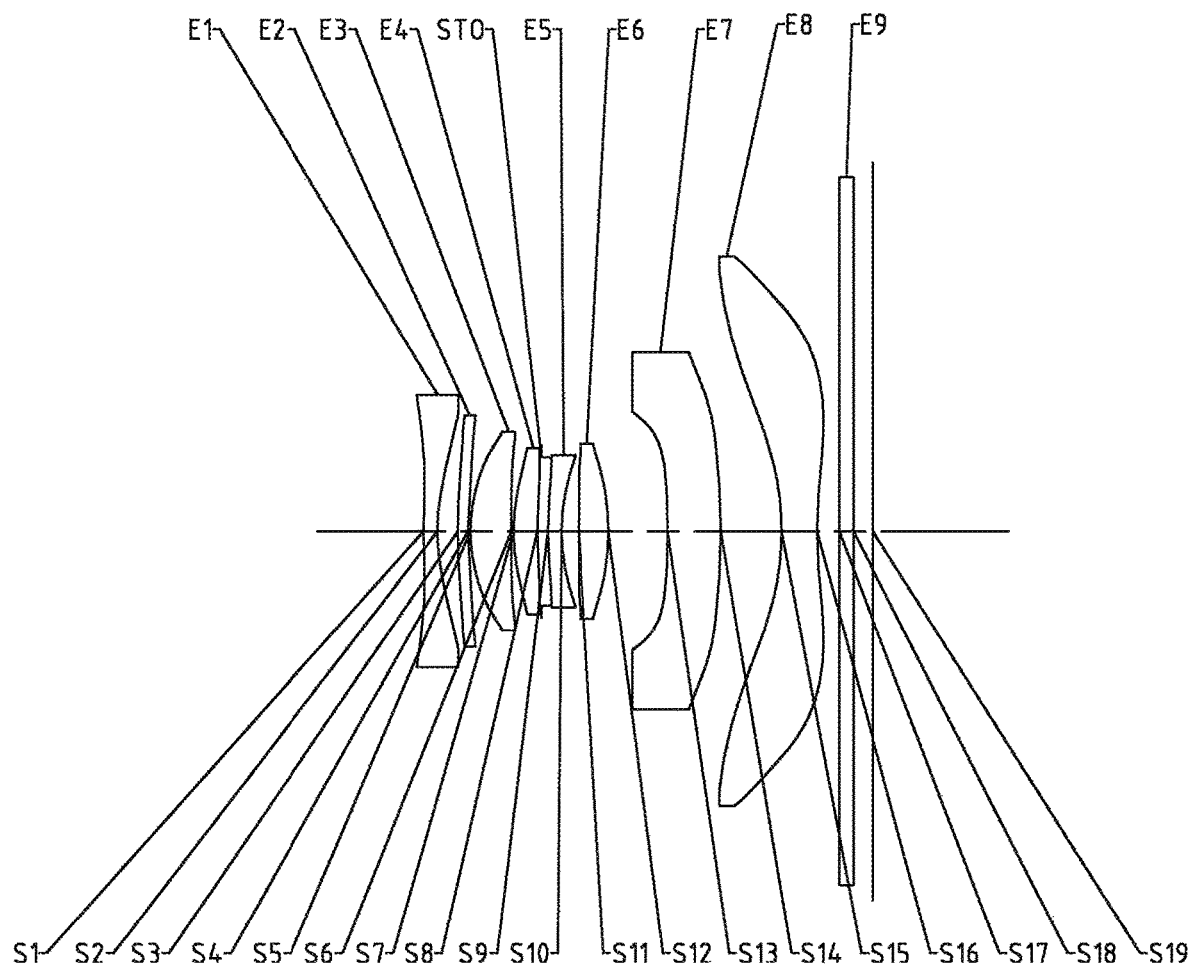
Fig. 3

OPTICAL IMAGING LENS ASSEMBLY

CROSS-REFERENCE TO RELATED APPLICATIONS

This application claims benefit of priority to Chinese Patent Application No. 201910424422.4 filed on May 21, 2019 before the China National Intellectual Property Administration, the entire disclosure of which is incorporated herein by reference in its entity.

TECHNICAL FIELD

The present disclosure relates to an optical imaging lens assembly, and more specifically, relates to an optical imaging lens assembly including eight lenses.

BACKGROUND

In recent years, with the popularization of electronic products, such as mobile phone and tablet computer, people's demand for the portable and thin and light electronic products is getting higher and higher. Further, with the popularization of large-size, high-pixel CMOS chips, more and more stringent requirements have been put forward on various aspects of matched optical lens assembly for electronic products. For example, the optical lens assembly is required to have large imaging size.

At present, due to the trend of miniaturization of electronic products, the total length of the lens assembly is limited, which makes the design of the lens assembly more difficult. The size of the imaging surface of a conventional lens assembly is usually only about ⅓ inch, and it is difficult for the conventional lens assembly to take into account the ultra-thin large image surface and high resolution while miniaturizing.

SUMMARY

The present disclosure provides an optical imaging lens assembly that is applicable to portable electronic products and at least solves or partially addresses at least one of the above disadvantages of the prior art.

The present disclosure provides an optical imaging lens assembly which includes, sequentially from an object side to an image side along an optical axis, a first lens, a second lens, a third lens, a fourth lens, a fifth lens, a sixth lens, a seventh lens, and an eighth lens having refractive power. The first lens may have a negative refractive power; both of the third lens and the sixth lens may have a positive refractive power; an object-side surface of the fourth lens may be a convex surface, and an image-side surface of the fourth lens may be a concave surface; and an object-side surface of the fifth lens may be a convex surface, and an image-side surface of the fifth lens may be a concave surface.

In one embodiment, a distance TTL along the optical axis from an object-side surface of the first lens to an imaging plane of the optical imaging lens assembly and half of a diagonal length ImgH of an effective pixel area on the imaging plane of the optical imaging lens assembly may satisfy $TTL/ImgH \leq 1.25$.

In one embodiment, an effective focal length f1 of the first lens and an effective focal length f8 of the eighth lens may satisfy $1.5 < f1/f8 < 2.5$.

In one embodiment, a total effective focal length f of the optical imaging lens assembly and an effective focal length f3 of the third lens may satisfy $1.4 < f/f3 < 2.5$.

In one embodiment, an effective focal length f6 of the sixth lens and a total effective focal length f of the optical imaging lens assembly may satisfy $1.5 < f6/f < 2.0$.

In one embodiment, a total effective focal length f of the optical imaging lens assembly and an entrance pupil diameter EPD of the optical imaging lens assembly may satisfy $f/EPD < 2.5$.

In one embodiment, a radius of curvature R7 of the object-side surface of the fourth lens and a radius of curvature R8 of the image-side surface of the fourth lens may satisfy $0 < R7/R8 < 1.5$.

In one embodiment, a radius of curvature R9 of the object-side surface of the fifth lens and a radius of curvature R10 of the image-side surface of the fifth lens may satisfy $1 < R9/R10 < 2.5$.

In one embodiment, a radius of curvature R4 of an image-side surface of the second lens and a radius of curvature R5 of an object-side surface of the third lens may satisfy $1.0 < R4/R5 < 2.5$.

In one embodiment, an air interval T67 between the sixth lens and the seventh lens along the optical axis and an air interval T78 between the seventh lens and the eighth lens along the optical axis may satisfy $0 < (T67+T78)/TTL < 0.5$.

In one embodiment, at least three lenses among the first lens to the eighth lens have a refractive index greater than or equal to 1.7.

In one embodiment, any one of the first lens to the eighth lens has a center thickness of less than 1 mm along the optical axis.

In one embodiment, half of a diagonal length ImgH of an effective pixel area on an imaging plane of the optical imaging lens assembly may satisfy $ImgH \geq 5$ mm.

In one embodiment, half of a maximal field-of-view Semi-FOV of the optical imaging lens assembly may satisfy Semi-HFOV$\geq 50°$.

The present disclosure employs eight lenses, and the optical imaging lens assembly has at least one advantageous effect such as ultra-thin, large image surface and high image quality and the like by rationally assigning the refractive power, the surface shape, the center thickness of each lens, and the on-axis spaced interval between the lenses and the like and optimally selecting the high-order aspheric parameters.

BRIEF DESCRIPTION OF THE DRAWINGS

Other features, objects, and advantages of the present disclosure will become more apparent from the following detailed description of the non-limiting embodiments with reference to the accompanying drawings. In the accompanying drawings:

FIGS. 2A to 2D illustrate a longitudinal aberration curve, an astigmatic curve, a distortion curve and a lateral color curve of the optical imaging lens assembly of the Example 1, respectively;

FIG. 3 illustrates a schematic structural view of an optical imaging lens assembly according to Example 2 of the present disclosure;

DETAILED DESCRIPTION OF EMBODIMENTS

Figure 1:
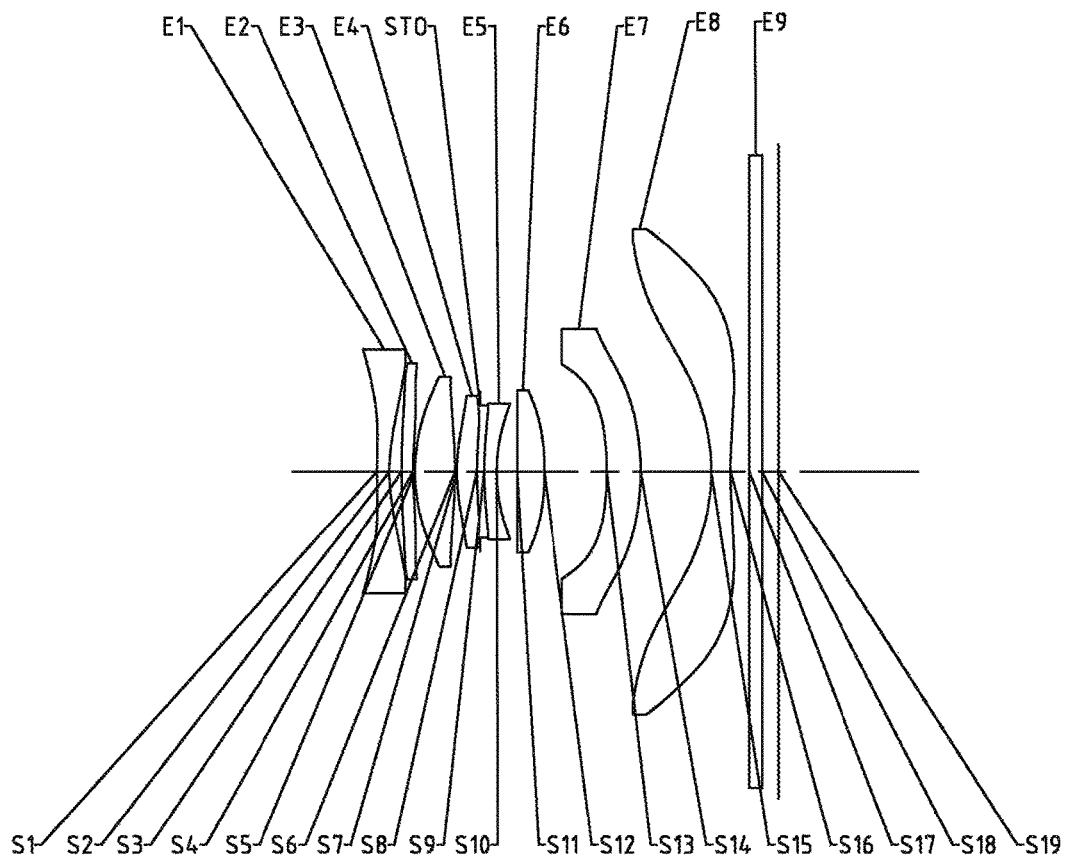
FIG. 1 illustrates a schematic structural view of an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the subject is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, eight lenses having refractive power, i.e. a first lens, a second lens, a third lens, a fourth lens, a fifth lens, a sixth lens, a seventh lens and an eighth lens. The eight lenses are arranged sequentially from an object side to an image side along an optical axis. Among the first lens to the eighth lens, there is an air gap between any two adjacent lenses.

In an exemplary embodiment, the first lens may have a negative refractive power; the second lens has a positive refractive power or a negative refractive power; the third lens may have a positive refractive power; the fourth lens has a positive refractive power or a negative refractive power, an object-side surface thereof may be a convex surface, and an image-side surface thereof may be a concave surface; the fifth lens has a positive refractive power or a negative refractive power, an object-side surface thereof may be a convex surface, and an image-side surface thereof may be a concave surface; the sixth lens may have a positive refractive power; the seventh lens has a positive refractive power or a negative refractive power; and the eighth lens has a positive refractive power or a negative refractive power. By rationally assigning the refractive power of each lens in the imaging lens assembly, the low-order aberrations of the system may be effectively compensated, which makes the system have a better imaging quality and processability.

In an exemplary embodiment, an image-side surface of the first lens may be a concave surface.

In an exemplary embodiment, an image-side surface of the sixth lens may be a convex surface.

In an exemplary embodiment, an object-side surface of the seventh lens may be a concave surface, and an image-side surface of the seventh lens may be a convex surface.

In an exemplary embodiment, an object-side surface of the eighth lens may be a concave surface.

In an exemplary embodiment, the optical imaging lens assembly according to the present disclosure may satisfy: TTL/ImgH≤1.25, where TTL is a distance along the optical axis from an object-side surface of the first lens to an imaging plane of the optical imaging lens assembly, and ImgH is half of a diagonal length of an effective pixel area on the imaging plane of the optical imaging lens assembly. More specifically, TTL and ImgH may further satisfy: 1.20≤TTL/ImgH≤1.25, for example, 1.23≤TTL/ImgH≤1.25. Satisfying the conditional expression TTL/ImgH≤1.25 is conducive to achieving the ultra-thin characteristic of the optical imaging lens assembly.

In an exemplary embodiment, the optical imaging lens assembly according to the present disclosure may satisfy: 1.5<f1/f8<2.5, where f1 is an effective focal length of the first lens and f8 is an effective focal length of the eighth lens. More specifically, f1 and f8 may further satisfy: 1.52≤f1/f8≤2.05. When the conditional expression 1.5<f1/f8<2.5 is satisfied, the ratio of the effective focal lengths of the first lens and the eighth lens may be reasonably constrained, so that the field curvature contribution of the first lens and the eighth lens may be reasonably controlled and compensated with each other to be in a reasonable state. Optionally, the eighth lens may have a negative refractive power.

In an exemplary embodiment, the optical imaging lens assembly according to the present disclosure may satisfy: 1.4<f/f3<2.5, where f is a total effective focal length of the optical imaging lens assembly and f3 is an effective focal length of the third lens. More specifically, f and f3 may further satisfy: 1.45≤f/f3≤2.19. When the conditional expression 1.4<f/f3<2.5 is satisfied, the spherical aberration contribution of the third lens may be controlled within a reasonable range, so that the on-axis field of view may obtain a good imaging quality.

In an exemplary embodiment, the optical imaging lens assembly according to the present disclosure may satisfy: 1.5<f6/f<2.0, where f6 is an effective focal length of the sixth lens and f is a total effective focal length of the optical imaging lens assembly. More specifically, f6 and f may further satisfy: 1.62≤f6/f≤1.98. When the conditional expression 1.5<f6/f<2.0 is satisfied, the effective focal length of the sixth lens may be reasonably controlled, and the deflection angle of light may be reduced, thereby reducing the sensitivity of the optical system.

In an exemplary embodiment, the optical imaging lens assembly according to the present disclosure may satisfy: f/EPD<2.5, where f is a total effective focal length of the optical imaging lens assembly and EPD is an entrance pupil diameter of the optical imaging lens assembly. More specifically, f and EPD may further satisfy: 2.0≤f/EPD≤2.2, for example, f/EPD=2.20. It should be understood that the smaller the ratio off to EPD is, the larger the clear aperture of the lens assembly will be, and the more the amount of light entering per unit time will be. By setting this, the brightness of the image surface may be effectively improved, so that the lens assembly may better meet the capturing requirements in low light conditions, such as cloudy, dusk, etc., and achieve a good imaging quality. When the conditional expression f/EPD<2.5 is satisfied, the optical imaging lens assembly may have a large relative aperture and a strong light collection ability.

In an exemplary embodiment, the optical imaging lens assembly according to the present disclosure may satisfy: 0<R7/R8<1.5, where R7 is a radius of curvature of the object-side surface of the fourth lens and R8 is a radius of curvature of the image-side surface of the fourth lens. More specifically, R7 and R8 may further satisfy: 0.2<R7/R8<1.2, for example, 0.43≤R7/R8≤1.05. When the conditional expression 0<R7/R8<1.5 is satisfied, the radius of curvature of the object-side surface and the image-side surface of the fourth lens may be reasonably controlled, which is beneficial for correcting the advanced spherical aberration and reducing the sensitivity of the lens.

In an exemplary embodiment, the optical imaging lens assembly according to the present disclosure may satisfy: 1≤R9/R10≤2.5, where R9 is a radius of curvature of the object-side surface of the fifth lens and R10 is a radius of curvature of the image-side surface of the fifth lens. More specifically, R9 and R10 may further satisfy: 1.00≤R9/R10≤2.47. When the conditional expression 1≤R9/R10<2.5 is satisfied, the radius of curvature of the object-side surface and the image-side surface of the fifth lens may be reasonably controlled, and the distortion of the optical imaging lens assembly may be controlled within an acceptable range to ensure a better imaging quality.

In an exemplary embodiment, the optical imaging lens assembly according to the present disclosure may satisfy: 1.0<R4/R5<2.5, where R4 is a radius of curvature of an image-side surface of the second lens and R5 is a radius of curvature of an object-side surface of the third lens. More specifically, R4 and R5 may further satisfy: 1.33≤R4/R5≤2.03. When the conditional expression 1.0<R4/R5<2.5 is satisfied, the radius of curvature of the image-side surface of the second lens and the radius of curvature of the object-side surface of the third lens may be reasonably distributed, and the optical imaging lens assembly may better match the chip's chief ray angle. Optionally, the image-side surface of the second lens may be a concave surface, and the object-side surface of the third lens may be a convex surface.

In an exemplary embodiment, the optical imaging lens assembly according to the present disclosure may satisfy: 0<(T67+T78)/TTL<0.5, where T67 is an air interval between the sixth lens and the seventh lens along the optical axis and T78 is an air interval between the seventh lens and the eighth lens along the optical axis. More specifically, T67, T78 and TTL may further satisfy: 0.2<(T67+T78)/TTL<0.4, for example, 0.27≤(T67+T78)/TTL≤0.34. When the conditional expression 0<(T67+T78)/TTL<0.5 is satisfied, the space ratio of the seventh lens may be reasonably controlled, the lens assembly process may be ensured, and the miniaturization of the optical imaging lens assembly may be achieved.

In an exemplary embodiment, the optical imaging lens assembly according to the present disclosure may satisfy: ImgH≥5 mm, where ImgH is half of a diagonal length of an effective pixel area on an imaging plane of the optical imaging lens assembly. More specifically, ImgH may further satisfy: 5 mm≤ImgH≤5.5 mm, for example, 5.21 mm≤ImgH≤5.30 mm. Satisfying the conditional expression ImgH≥5 mm helps to achieve a large imaging surface of the optical imaging lens assembly.

In an exemplary embodiment, the optical imaging lens assembly according to the present disclosure may satisfy: Semi-HFOV≥50°, where Semi-FOV is half of a maximal field-of-view of the optical imaging lens assembly. More specifically, Semi-FOV may further satisfy: 50°≤Semi-HFOV≤55°, for example, 50.0°≤Semi-HFOV≤50.6°. By reasonably controlling the field of view of the optical imaging lens assembly, the optical imaging lens assembly may have a larger imaging range.

In an exemplary embodiment, at least three lenses of the first to eighth lenses of the optical imaging lens assembly according to the present disclosure may have a refractive index that is greater than or equal to 1.7. The use of high-refractive-index lenses in optical imaging lens assemblies is more conducive to correcting system chromatic aberration and compensating system aberrations, thereby improving the imaging quality of the lens assembly. For example, the refractive indexes of the third lens, the fifth lens, and the seventh lens may be greater than or equal to 1.7. Further, the refractive index of the second lens may be greater than or equal to 1.7 too.

In an exemplary embodiment, any one of the first lens to the eighth lens in the optical imaging lens assembly according to the present disclosure has a center thickness along the optical axis of less than 1 mm. Reasonably controlling the center thickness of each lens in the optical imaging system may help improve the processability of lens molding and the assembly of the lens, and also help ensure the miniaturization of the lens assembly.

In an exemplary embodiment, the optical imaging lens assembly described above may further include at least one stop. The stop may be disposed at an appropriate position as needed, for example, between the fourth lens and the fifth lens. Optionally, the above optical imaging lens assembly may further include an optical filter for correcting the color deviation and/or a protective glass for protecting the photosensitive element on the imaging plane.

The optical imaging lens assembly according to the above embodiments of the present disclosure may employ a plurality of lenses, such as eight lenses as described above. By properly assigning the refractive power of each lens, the surface shape, the center thickness of each lens, and spaced distances on the optical axis between the lenses, the size and the sensitivity of the imaging lens assembly may be effectively reduced, and the workability of the imaging lens assembly may be improved, such that the optical imaging lens assembly is more advantageous for production processing and may be applied to portable electronic products. The disclosure provides a solution for an eight-piece lens. The optical imaging lens assembly has the characteristics of ultra-thin, large image surface, good imaging quality, etc., and may match a higher pixel sensor and be applicable to a stronger image processing technology.

In the embodiments of the present disclosure, at least one of the surfaces of each lens is aspheric, that is, at least one of the object-side surface and the image-side surface of each of the first lens, the second lens, the third lens, the fourth lens, the fifth lens, the sixth lens, the seventh lens, and the eighth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration.

With aspheric lens, the aberrations that occur during imaging may be eliminated as much as possible, and thus improving the image quality. Optionally, the object-side surface and the image-side surface of each of the first lens, the second lens, the third lens, the fourth lens, the fifth lens, the sixth lens, the seventh lens, and the eighth lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking eight lenses as an example, the optical imaging lens assembly is not limited to include eight lenses. The optical imaging lens assembly may also include other numbers of lenses if desired.

Some specific examples of an optical imaging lens assembly applicable to the above embodiment will be further described below with reference to the accompanying drawings.

EXAMPLE 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly includes a first lens E1, a second lens E2, a third lens E3, a fourth lens E4, a stop STO, a fifth lens E5, a sixth lens E6, a seventh lens E7, an eighth lens E8, an optical filter E9 and an imaging plane S19, which are sequentially arranged from an object side to an image side along an optical axis.

The first lens 1 has a negative refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a positive refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a convex surface, and an image-side surface S12 of the sixth lens E6 is a convex surface. The seventh lens E7 has a positive refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19. Here, any one of the first lens E1 to the eighth lens E8 has a center thickness along the optical axis of less than 1 mm.

In this example, the refractive indexes of the second lens E2, the third lens E3, the fifth lens E5, and the seventh lens E7 are all set to be greater than or equal to 1.7, thereby further improving the imaging quality of the lens assembly.

Table 1 shows a table of basic parameters of the optical imaging lens assembly in example 1, wherein the units for the radius of curvature, the thickness and the focal length are millimeter (mm).

TABLE 1

Example 1: f = 4.77 mm, TTL = 6.50 mm, ImgH = 5.30 mm, Semi-FOV = 50.6°

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| S1 | aspheric | 10.2059 | 0.2000 | 1.63 | 34.9 | −6.81 | 1.3746 |
| S2 | aspheric | 3.0254 | 0.1966 | | | | −0.0266 |
| S3 | aspheric | 9.8016 | 0.1856 | 1.74 | 39.4 | −9.15 | −1.1452 |
| S4 | aspheric | 3.9880 | 0.0300 | | | | 0.4920 |
| S5 | aspheric | 2.5446 | 0.6492 | 1.74 | 44.9 | 2.56 | −0.1240 |
| S6 | aspheric | −6.8254 | 0.0300 | | | | −0.2713 |
| S7 | aspheric | 2.9549 | 0.3254 | 1.66 | 53.7 | 9.11 | 1.3656 |
| S8 | aspheric | 5.5381 | 0.0500 | | | | 2.9620 |
| STO | spherical | infinite | 0.0669 | | | | |
| S9 | aspheric | 5.6492 | 0.2000 | 1.76 | 27.6 | −6.93 | 7.5250 |
| S10 | aspheric | 2.6852 | 0.3321 | | | | 1.0211 |
| S11 | aspheric | 113.3629 | 0.4428 | 1.49 | 70.4 | 8.47 | −99.0000 |
| S12 | aspheric | −4.2910 | 1.0165 | | | | −0.3735 |
| S13 | aspheric | −5.1528 | 0.5481 | 1.76 | 27.6 | 17.65 | 4.8665 |
| S14 | aspheric | −3.8940 | 1.1409 | | | | −8.9798 |
| S15 | aspheric | −3.2249 | 0.3105 | 1.59 | 39.8 | −3.94 | −1.1698 |
| S16 | aspheric | 8.8738 | 0.3012 | | | | −0.1783 |
| S17 | spherical | infinite | 0.2100 | 1.52 | 64.2 | | |
| S18 | spherical | infinite | 0.2643 | | | | |
| S19 | spherical | infinite | | | | | |

Where, f is a total effective focal length of the optical imaging lens assembly, TTL is a distance along the optical axis from the object-side surface S1 of the first lens E1 to the imaging plane S19 of the optical imaging lens assembly, ImgH is half of a diagonal length of an effective pixel area on the imaging plane S19 of the optical imaging lens assembly, and Semi-FOV is half of a maximal field-of-view of the optical imaging lens assembly.

In example 1, the object-side surface and the image-side surface of any one of the first lens E1 to the eight lens E8 are aspheric. The surface shape x of each aspheric lens may be defined by using, but not limited to, the following aspheric formula:

$$x = \frac{ch^2}{1 + \sqrt{1 - (k+1)c^2 h^2}} + \sum A_i h^i \qquad (1)$$

Where, x is the sag—the axis-component of the displacement of the surface from the aspheric vertex, when the surface is at height h in a direction parallel to the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1-S16 in example 1.

TABLE 2

| Surface number | A4 | A6 | A8 | A10 | A12 | A14 |
|---|---|---|---|---|---|---|
| S1 | −8.2229E−02 | 1.4297E−02 | 1.1171E−02 | −8.5260E−03 | 3.0875E−03 | −7.6208E−04 |
| S2 | −5.6227E−02 | 1.4038E−02 | 1.8252E−02 | −3.4817E−02 | 2.5249E−02 | −1.0083E−02 |

TABLE 2-continued

| S3 | −5.2783E−02 | 9.1566E−02 | −8.8521E−02 | 5.0126E−02 | −2.1889E−02 | 8.5547E−03 |
| S4 | −2.2057E−01 | 3.0932E−01 | −3.4463E−01 | 2.8479E−01 | −1.6765E−01 | 6.6878E−02 |
| S5 | −1.1006E−01 | 1.9137E−01 | 2.3761E−01 | 2.2187E−01 | −1.5028E−01 | 7.1093E−02 |
| S6 | 2.9374E−02 | −5.2088E−03 | 2.9163E−04 | −1.4605E−02 | 3.6087E−02 | −3.8105E−02 |
| S7 | −7.3857E−02 | 4.0311E−02 | 3.3817E−02 | −1.1787E−02 | 7.4564E−02 | −1.0746E−01 |
| S8 | −8.8928E−02 | 2.5427E−02 | 8.9232E−02 | 3.5014E−01 | 6.3949E−01 | −7.1852E−01 |
| S9 | −3.0273E−02 | −2.5389E−02 | 9.3705E−02 | −2.4798E−01 | 3.8480E−01 | −3.6226E−01 |
| S10 | −5.8231E−03 | −4.5328E−02 | 1.3650E−01 | −3.7264E−01 | 6.5376E−01 | −7.2037E−01 |
| S11 | −6.8260E−04 | 2.9625E−03 | −1.5674E−02 | 3.1888E−02 | −5.5692E−02 | 6.7792E−02 |
| S12 | −1.5439E−02 | −5.4581E−03 | −5.0954E−03 | 2.5821E−02 | −4.4886E−02 | 3.7213E−02 |
| S13 | −1.1063E−02 | −1.2219E−02 | 8.5743E−03 | −1.2850E−02 | 1.1496E−02 | −6.3490E−03 |
| S14 | −1.0629E−02 | −8.4161E−04 | 3.2776E−03 | 2.6549E−03 | −1.1383E−03 | 3.3258E−04 |
| S15 | 1.0605E−02 | −9.7190E−03 | 3.2973E−03 | −5.6788E−04 | 5.9799E−05 | −4.0495E−06 |
| S16 | −1.4743E−02 | −6.3657E−04 | 6.2527E−04 | −1.5331E−04 | 2.1243E−05 | −1.8436E−06 |

| Surface number | A16 | A18 | A20 |
|---|---|---|---|
| S1 | 1.3353E−04 | −1.4588E−05 | 7.1628E−07 |
| S2 | 2.4113E−03 | −3.3500E−04 | 2.1072E−05 |
| S3 | −2.4703E−03 | 4.0912E−04 | −2.8251E−05 |
| S4 | −1.6944E−02 | 2.4450E−03 | −1.5230E−04 |
| S5 | −2.2749E−02 | 4.3910E−03 | −3.7154E−04 |
| S6 | 2.0650E−02 | −5.7248E−03 | 6.5917E−04 |
| S7 | 7.9077E−02 | −2.9252E−02 | 4.2259E−03 |
| S8 | 4.9834E−01 | −1.9437E−01 | 3.2381E−02 |
| S9 | 2.0327E−01 | −6.0911E−02 | 6.8361E−03 |
| S10 | 4.8791E−01 | −1.8614E−01 | 3.0565E−02 |
| S11 | −5.1479E−02 | 2.1500E−02 | −3.5886E−03 |
| S12 | −1.4054E−02 | 9.2603E−04 | 5.8548E−04 |
| S13 | 2.1447E−03 | −4.1245E−04 | 3.5168E−05 |
| S14 | −5.9685E−05 | 5.7233E−06 | −2.2347E−07 |
| S15 | 1.7339E−07 | −4.2967E−09 | 4.7123E−11 |
| S16 | 9.8241E−08 | −2.8817E−09 | 3.4887E−11 |

Figure 2A:
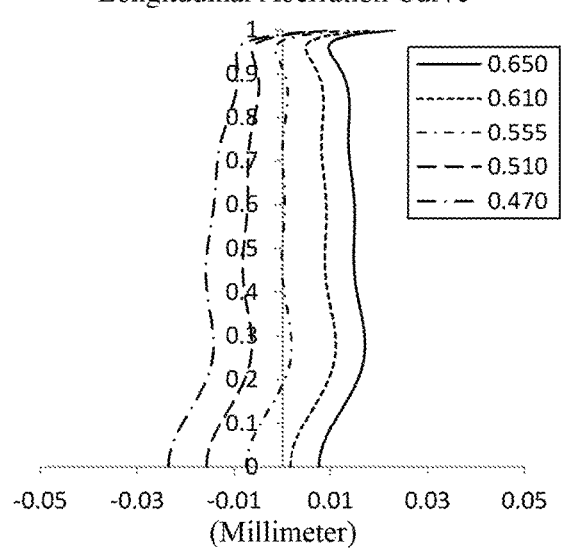
Figure 2B:
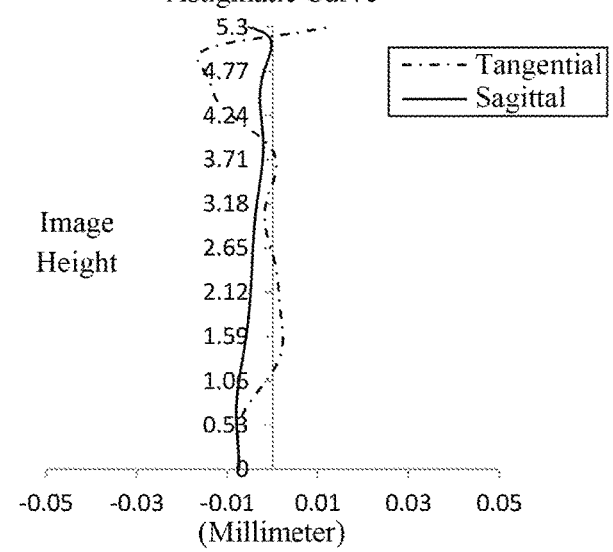

FIG. 2A illustrates a longitudinal aberration curve of the optical imaging lens assembly according to example 1, representing deviations of focal points converged by light of different wavelengths after passing through the optical imaging lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion at different image heights. FIG. 2D illustrates a lateral color curve of the optical imaging lens assembly according to example 1, representing deviations of different image heights on an imaging plane after light passes through the optical imaging lens assembly. It can be seen from FIG. 2A to FIG. 2D that the optical imaging lens assembly provided in example 1 may achieve good image quality.

EXAMPLE 2

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a first lens E1, a second lens E2, a third lens E3, a fourth lens E4, a stop STO, a fifth lens E5, a sixth lens E6, a seventh lens E7, an eighth lens E8, an optical filter E9 and an imaging plane S19, which are sequentially arranged from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a convex surface, and an image-side surface S12 of the sixth lens E6 is a convex surface. The seventh lens E7 has a positive refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19. Here, any one of the first lens E1 to the eighth lens E8 has a center thickness along the optical axis of less than 1 mm.

In this example, the refractive indexes of the third lens E3, the fifth lens E5, and the seventh lens E7 are all set to be greater than or equal to 1.7, thereby further improving the imaging quality of the lens assembly.

Table 3 shows a table of basic parameters of the optical imaging lens assembly in example 2, wherein the units for the radius of curvature, the thickness and the focal length are millimeter (mm). Table 4 shows high-order coefficients applicable to each aspheric surface in example 2, wherein the surface shape of each aspheric surface may be defined by the formula (1) given in the above example 1.

heights. FIG. 4D illustrates a lateral color curve of the optical imaging lens assembly according to example 2, representing deviations of different image heights on an imaging plane after light passes through the optical imaging lens assembly. It can be seen from FIG. 4A to FIG. 4D that the optical imaging lens assembly provided in example 2 may achieve good image quality.

TABLE 3

Example 2: f = 4.73 mm, TTL = 6.50 mm, ImgH = 5.21 mm, Semi-FOV = 50.0°

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| S1 | aspheric | 7.2841 | 0.2000 | 1.62 | 36.0 | −7.43 | 3.5724 |
| S2 | aspheric | 2.8099 | 0.2938 | | | | −0.0462 |
| S3 | aspheric | 8.0604 | 0.1463 | 1.66 | 38.9 | −9.64 | −2.9306 |
| S4 | aspheric | 3.5367 | 0.0382 | | | | 0.5397 |
| S5 | aspheric | 2.1777 | 0.5890 | 1.72 | 47.1 | 3.05 | −0.0257 |
| S6 | aspheric | 250.0020 | 0.0300 | | | | −99.0000 |
| S7 | aspheric | 2.5638 | 0.3453 | 1.65 | 55.5 | 6.64 | 1.2397 |
| S8 | aspheric | 5.9837 | 0.0583 | | | | 8.9694 |
| STO | spherical | infinite | 0.0927 | | | | |
| S9 | aspheric | 5.4451 | 0.2000 | 1.76 | 27.6 | −8.33 | 5.3061 |
| S10 | aspheric | 2.8814 | 0.2507 | | | | 1.3410 |
| S11 | aspheric | 184.4823 | 0.4310 | 1.49 | 70.4 | 8.00 | 55.0000 |
| S12 | aspheric | −3.9935 | 0.8546 | | | | −2.8781 |
| S13 | aspheric | −15.2587 | 0.7672 | 1.76 | 27.6 | 23.32 | 24.9476 |
| S14 | aspheric | −8.3782 | 0.8785 | | | | −80.5493 |
| S15 | aspheric | −4.1273 | 0.5101 | 1.60 | 44.3 | −3.80 | −1.3777 |
| S16 | aspheric | 5.4575 | 0.3206 | | | | −2.6112 |
| S17 | spherical | infinite | 0.2100 | 1.52 | 64.2 | | |
| S18 | spherical | infinite | 0.2837 | | | | |
| S19 | spherical | infinite | | | | | |

TABLE 4

| Surface number | A4 | A6 | A8 | A10 | A12 | A14 | A16 | A18 | A20 |
|---|---|---|---|---|---|---|---|---|---|
| S1 | −7.1706E−02 | 1.4252E−03 | 2.2289E−02 | −1.4239E−02 | 4.7200E−03 | −9.7050E−04 | 1.2630E−04 | −9.6277E−06 | 3.2410E−07 |
| S2 | −4.3925E−02 | −1.1790E−02 | 3.0799E−02 | −3.0742E−02 | 2.0937E−02 | −9.2377E−03 | 2.3246E−03 | −2.8075E−04 | 1.0489E−05 |
| S3 | −3.1248E−02 | 5.2448E−02 | −6.8919E−02 | 6.3203E−02 | −4.4375E−02 | 2.1814E−02 | −6.7429E−03 | 1.1712E−03 | −8.7191E−05 |
| S4 | −2.1306E−01 | 2.5193E−01 | −2.2738E−01 | 1.6871E−01 | −1.0418E−01 | 4.7550E−02 | −1.4006E−02 | 2.3203E−03 | −1.6294E−04 |
| S5 | −1.0442E−01 | 1.4544E−01 | −1.2964E−01 | 1.0066E−01 | −7.0371E−02 | 3.8265E−02 | −1.3963E−02 | 2.8368E−03 | −2.2865E−04 |
| S6 | 1.6055E−02 | −7.1672E−03 | −7.1715E−03 | 4.4475E−02 | −6.5242E−02 | 5.1111E−02 | −2.4290E−02 | 6.7010E−03 | −8.0499E−04 |
| S7 | −7.2992E−02 | 2.9897E−02 | −6.7571E−02 | 1.3820E−01 | −2.0159E−01 | 1.9043E−01 | −1.1473E−01 | 4.1830E−02 | −7.0191E−03 |
| S8 | −5.7618E−02 | 1.5507E−02 | −1.8843E−02 | 2.3751E−02 | −5.8702E−02 | 1.1121E−01 | −1.1895E−01 | 6.6860E−02 | −1.5438E−02 |
| S9 | −3.3178E−02 | 2.4524E−03 | −3.2438E−02 | 7.1948E−02 | −1.4554E−01 | 1.9563E−01 | −1.5697E−01 | 6.7873E−02 | −1.2510E−02 |
| S10 | −6.3004E−03 | −1.4333E−03 | −3.4671E−02 | 1.1008E−01 | −2.5671E−01 | 3.7373E−01 | −3.1898E−01 | 1.4660E−01 | −2.8217E−02 |
| S11 | −7.6469E−04 | 1.0120E−02 | −1.8990E−02 | 3.1276E−02 | −2.6733E−02 | 1.4015E−02 | −5.5653E−03 | 4.0400E−03 | −1.5683E−03 |
| S12 | −2.7059E−02 | 5.3577E−03 | −5.0945E−02 | 1.7113E−01 | −3.1549E−01 | 3.5164E−01 | −2.3276E−01 | 8.4783E−02 | −1.2909E−02 |
| S13 | −7.2003E−03 | −2.0225E−02 | 1.7854E−02 | −2.1407E−02 | 1.6726E−02 | −8.4566E−03 | 2.6454E−03 | −4.7716E−04 | 3.8824E−05 |
| S14 | 6.2413E−03 | −4.1800E−03 | −7.7634E−04 | 7.1891E−04 | −1.8527E−04 | 2.1880E−05 | −6.0973E−07 | −9.7428E−08 | 6.5728E−09 |
| S15 | 5.6893E−04 | −4.8345E−03 | 2.9824E−03 | −7.3805E−04 | 1.0246E−04 | −8.6708E−06 | 4.4675E−07 | −1.2941E−08 | 1.6200E−10 |
| S16 | −2.9649E−02 | 5.4981E−03 | −9.8114E−04 | 1.3656E−04 | −1.5205E−05 | 1.2786E−06 | −7.3528E−08 | 2.5441E−09 | −3.9542E−11 |

Figure 4A:
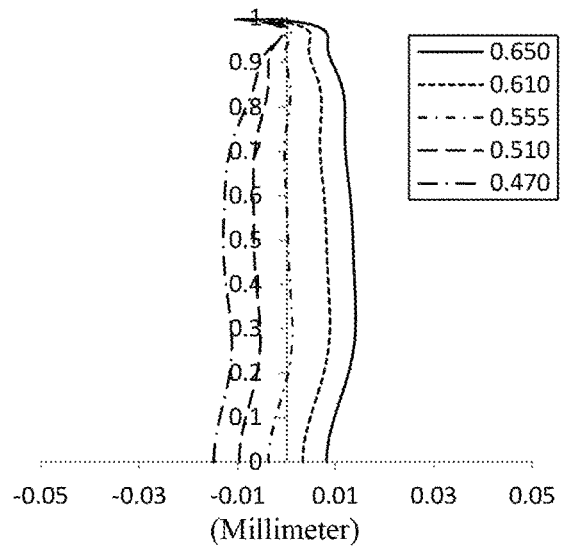
FIGS. 4A to 4D illustrate a longitudinal aberration curve, an astigmatic curve, a distortion curve and a lateral color curve of the optical imaging lens assembly of the Example 2, respectively.
Figure 4B:
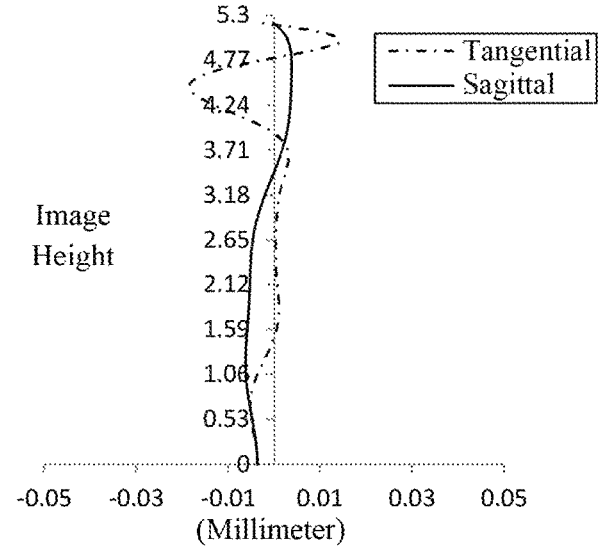
Figure 4C:
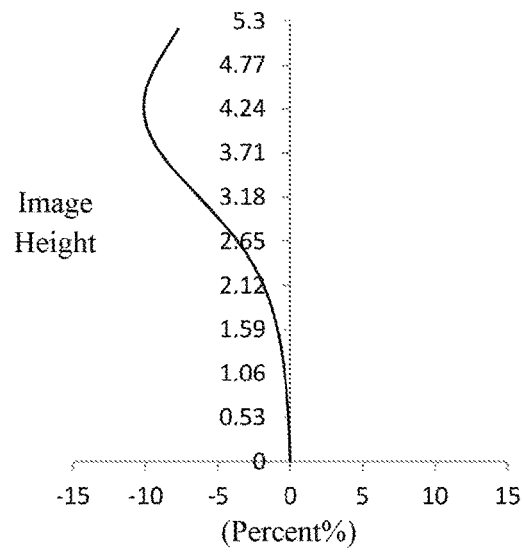
Figure 4D:
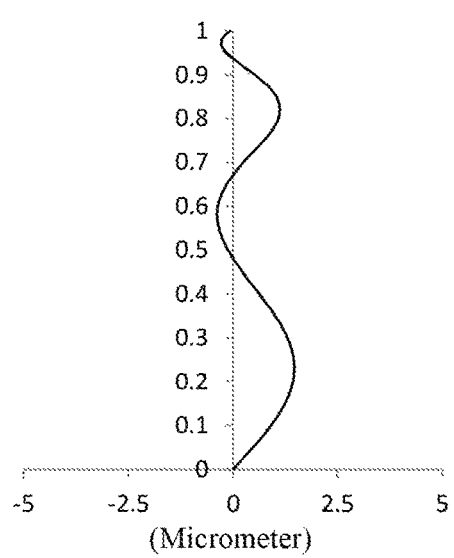

FIG. 4A illustrates a longitudinal aberration curve of the optical imaging lens assembly according to example 2, representing deviations of focal points converged by light of different wavelengths after passing through the optical imaging lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion at different image

EXAMPLE 3

Figure 5:
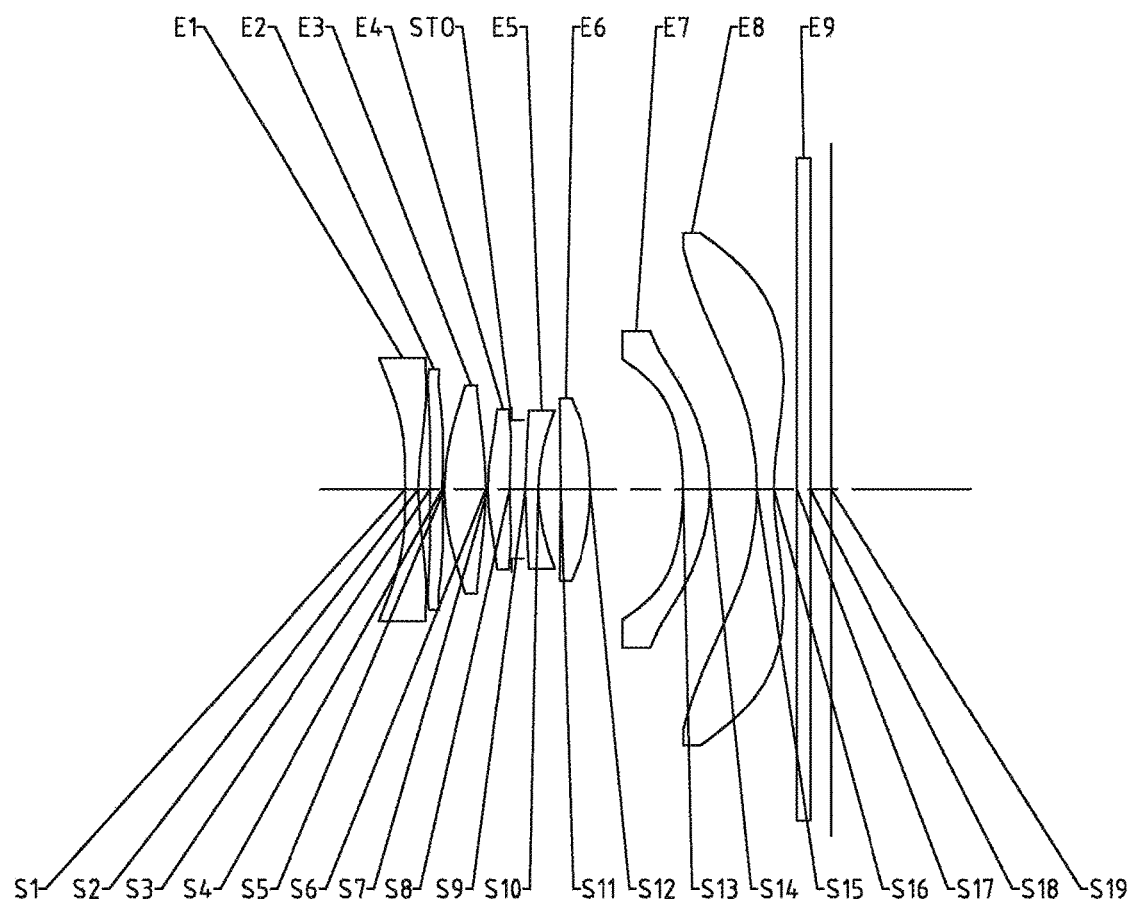
FIG. 5 illustrates a schematic structural view of an optical imaging lens assembly according to Example 3 of the present disclosure.

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a first lens E1, a second lens E2, a third lens E3, a fourth lens E4, a stop STO, a fifth lens E5, a sixth lens E6, a seventh lens E7, an eighth lens E8, an optical filter E9 and an imaging plane S19, which are sequentially arranged from an object side to an image side along an optical axis.

The first lens E1 has a negative refractive power. An object-side surface S1 of the first lens E1 is a concave surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a positive refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19. Here, any one of the first lens E1 to the eighth lens E8 has a center thickness along the optical axis of less than 1 mm.

In this example, the refractive indexes of the second lens E2, the third lens E3, the fifth lens E5, and the seventh lens E7 are all set to be greater than or equal to 1.7, thereby further improving the imaging quality of the lens assembly.

Table 5 shows a table of basic parameters of the optical imaging lens assembly in example 3, wherein the units for the radius of curvature, the thickness and the focal length are millimeter (mm). Table 6 shows high-order coefficients applicable to each aspheric surface in example 3, wherein the surface shape of each aspheric surface may be defined by the formula (1) given in the above example 1.

TABLE 5

Example 3: f = 4.55 mm, TTL = 6.50 mm, ImgH = 5.21 mm, Semi-FOV = 50.0°

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| S1 | aspheric | −518.0589 | 0.2000 | 1.66 | 33.5 | −6.13 | −99.0000 |
| S2 | aspheric | 4.0730 | 0.1811 | | | | 0.1625 |
| S3 | aspheric | 41.0820 | 0.1854 | 1.73 | 45.5 | −9.07 | −99.0000 |
| S4 | aspheric | 5.7418 | 0.0300 | | | | 1.1683 |
| S5 | aspheric | 2.9680 | 0.6336 | 1.74 | 45.2 | 2.57 | −0.2755 |
| S6 | aspheric | −4.8814 | 0.0300 | | | | −1.1425 |
| S7 | aspheric | 3.0275 | 0.3328 | 1.64 | 56.1 | 8.01 | 1.2774 |
| S8 | aspheric | 6.9818 | 0.0300 | | | | 5.5853 |
| STO | spherical | infinite | 0.2069 | | | | |
| S9 | aspheric | 6.6717 | 0.2000 | 1.76 | 27.6 | −6.32 | 11.2286 |
| S10 | aspheric | 2.7575 | 0.3411 | | | | 1.0523 |
| S11 | aspheric | −98.9350 | 0.4554 | 1.49 | 70.4 | 8.99 | −88.1789 |
| S12 | aspheric | −4.2151 | 1.4167 | | | | −1.9441 |
| S13 | aspheric | −4.7303 | 0.4089 | 1.75 | 32.7 | 7.02 | 4.0713 |
| S14 | aspheric | −2.5912 | 0.7172 | | | | −6.5778 |
| S15 | aspheric | −4.1248 | 0.2586 | 1.63 | 35.4 | −3.22 | −1.0480 |
| S16 | aspheric | 4.1330 | 0.3481 | | | | −2.6959 |
| S17 | spherical | infinite | 0.2100 | 1.52 | 64.2 | | |
| S18 | spherical | infinite | 0.3113 | | | | |
| S19 | spherical | infinite | | | | | |

TABLE 6

| Surface number | A4 | A6 | A8 | A10 | A12 | A14 | A16 | A18 | A20 |
|---|---|---|---|---|---|---|---|---|---|
| S1 | −8.1744E−02 | 1.7837E−02 | 1.1334E−02 | −1.1557E−02 | 5.7066E−03 | −1.8961E−03 | 4.1108E−04 | −5.1063E−05 | 2.7172E−06 |
| S2 | −5.2510E−02 | 9.2346E−03 | 2.6299E−02 | −4.1708E−02 | 2.7551E−02 | −9.7625E−03 | 1.9472E−03 | −2.1012E−04 | 9.9100E−06 |
| S3 | −4.8673E−02 | 7.3354E−02 | −5.2820E−02 | 1.1296E−02 | 4.3556E−03 | −2.8966E−03 | 6.6972E−04 | −8.2281E−05 | 5.1830E−06 |
| S4 | −2.2020E−01 | 3.0233E−01 | −3.1696E−01 | 2.4097E−01 | −1.2912E−01 | 4.6624E−02 | −1.0631E−02 | 1.3711E−03 | −7.5720E−05 |
| S5 | −1.0933E−01 | 1.9399E−01 | −2.3610E−01 | 2.0743E−01 | −1.3190E−01 | 5.9500E−02 | −1.8549E−02 | 3.5614E−03 | −3.0515E−04 |
| S6 | 3.8662E−02 | −3.2408E−02 | 5.1003E−02 | −7.4965E−02 | 7.9322E−02 | −5.4614E−02 | 2.2719E−02 | −5.2057E−03 | 5.1343E−04 |
| S7 | −6.2379E−02 | 4.7383E−03 | 1.1556E−02 | −3.1980E−02 | 3.3936E−02 | −1.7938E−02 | 2.6008E−03 | 1.5756E−03 | −5.7053E−04 |
| S8 | −7.9342E−02 | 3.2451E−02 | −4.3338E−02 | 7.9592E−02 | −1.4146E−01 | 1.7299E−01 | −1.2862E−01 | 5.1956E−02 | −8.7475E−03 |
| S9 | −2.8076E−02 | −9.0935E−02 | 1.5051E−03 | 1.6756E−02 | −2.6239E−02 | 1.7030E−02 | −3.0963E−03 | −1.7748E−03 | 6.5259E−04 |
| S10 | −1.2612E−02 | −1.5328E−02 | 8.1527E−03 | 5.7810E−03 | −1.8937E−02 | 2.0567E−02 | −1.2120E−02 | 3.7733E−03 | −4.9621E−04 |
| S11 | 2.6584E−03 | 6.8738E−03 | −3.2951E−02 | 6.8019E−02 | −9.7973E−02 | 9.1803E−02 | −5.3054E−02 | 1.6993E−02 | −2.2390E−03 |
| S12 | −1.0675E−02 | −6.8554E−03 | 1.8761E−02 | −4.6716E−02 | 6.8080E−02 | −6.3150E−02 | 3.6149E−02 | −1.1681E−02 | 1.6470E−03 |
| S13 | −9.6794E−03 | 9.8867E−03 | −1.5264E−02 | 8.0311E−03 | −2.3404E−03 | 3.5518E−04 | −9.5232E−06 | −5.5103E−06 | 7.7227E−07 |
| S14 | −2.1374E−02 | 1.9699E−02 | −1.9575E−02 | 9.9053E−03 | −3.0613E−03 | 6.2709E−04 | −8.2356E−05 | 6.1835E−06 | −2.0000E−07 |

TABLE 6-continued

| Surface number | A4 | A6 | A8 | A10 | A12 | A14 | A16 | A18 | A20 |
|---|---|---|---|---|---|---|---|---|---|
| S15 | 2.1874E−02 | −1.9484E−02 | 7.1338E−03 | −1.4081E−03 | 1.6930E−04 | −1.2822E−05 | 5.9972E−07 | −1.5877E−08 | 1.8243E−10 |
| S16 | −2.9671E−02 | 2.9627E−03 | 2.2763E−04 | −1.4254E−04 | 2.3994E−05 | −2.2025E−06 | 1.1682E−07 | −3.3348E−09 | 3.9484E−11 |

Figure 6A:
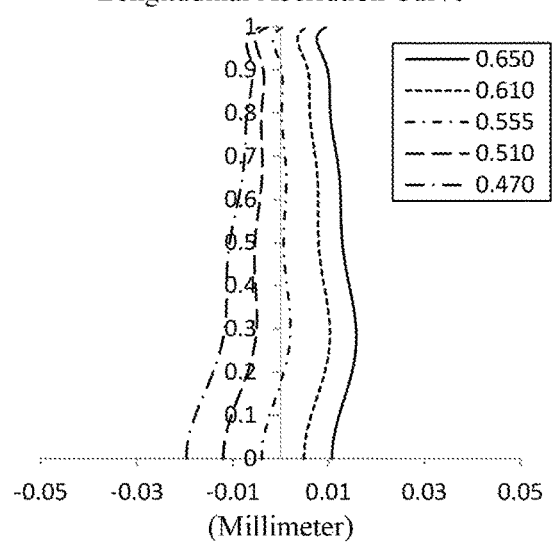
FIGS. 6A to 6D illustrate a longitudinal aberration curve, an astigmatic curve, a distortion curve and a lateral color curve of the optical imaging lens assembly of the Example 3, respectively.
Figure 6B:
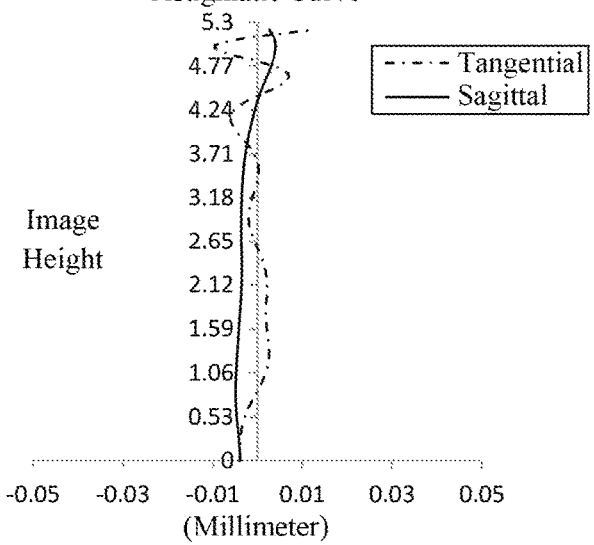
Figures 6C, 6D:
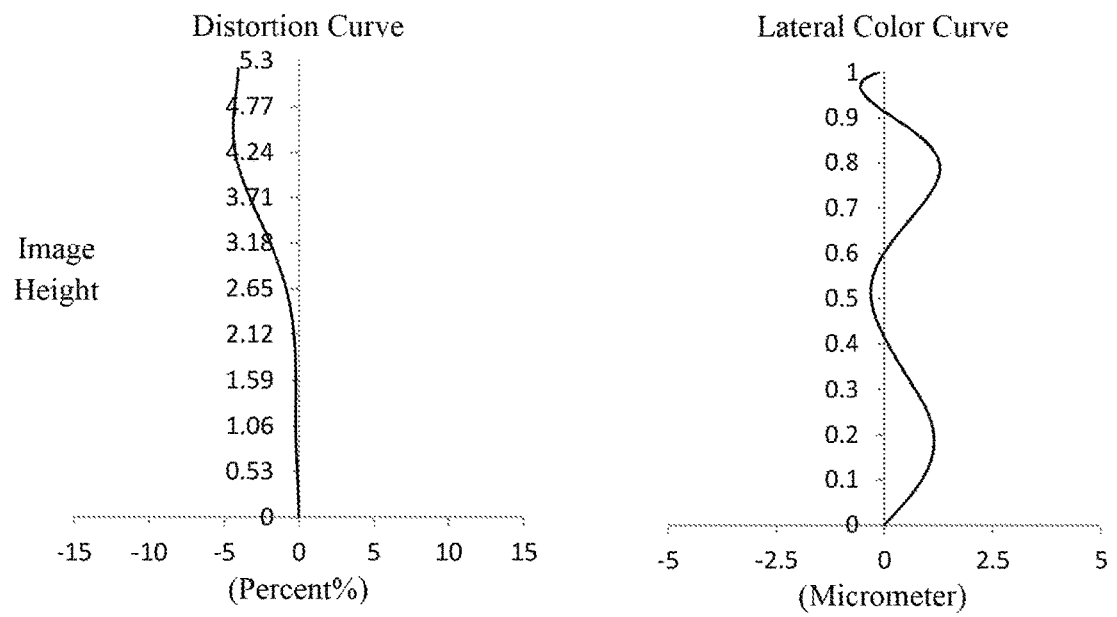

FIG. 6A illustrates a longitudinal aberration curve of the optical imaging lens assembly according to example 3, representing deviations of focal points converged by light of different wavelengths after passing through the optical imaging lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion at different image heights. FIG. 6D illustrates a lateral color curve of the optical imaging lens assembly according to example 3, representing deviations of different image heights on an imaging plane after light passes through the optical imaging lens assembly. It can be seen from FIG. 6A to FIG. 6D that the optical imaging lens assembly provided in example 3 may achieve good image quality.

EXAMPLE 4

Figure 7:
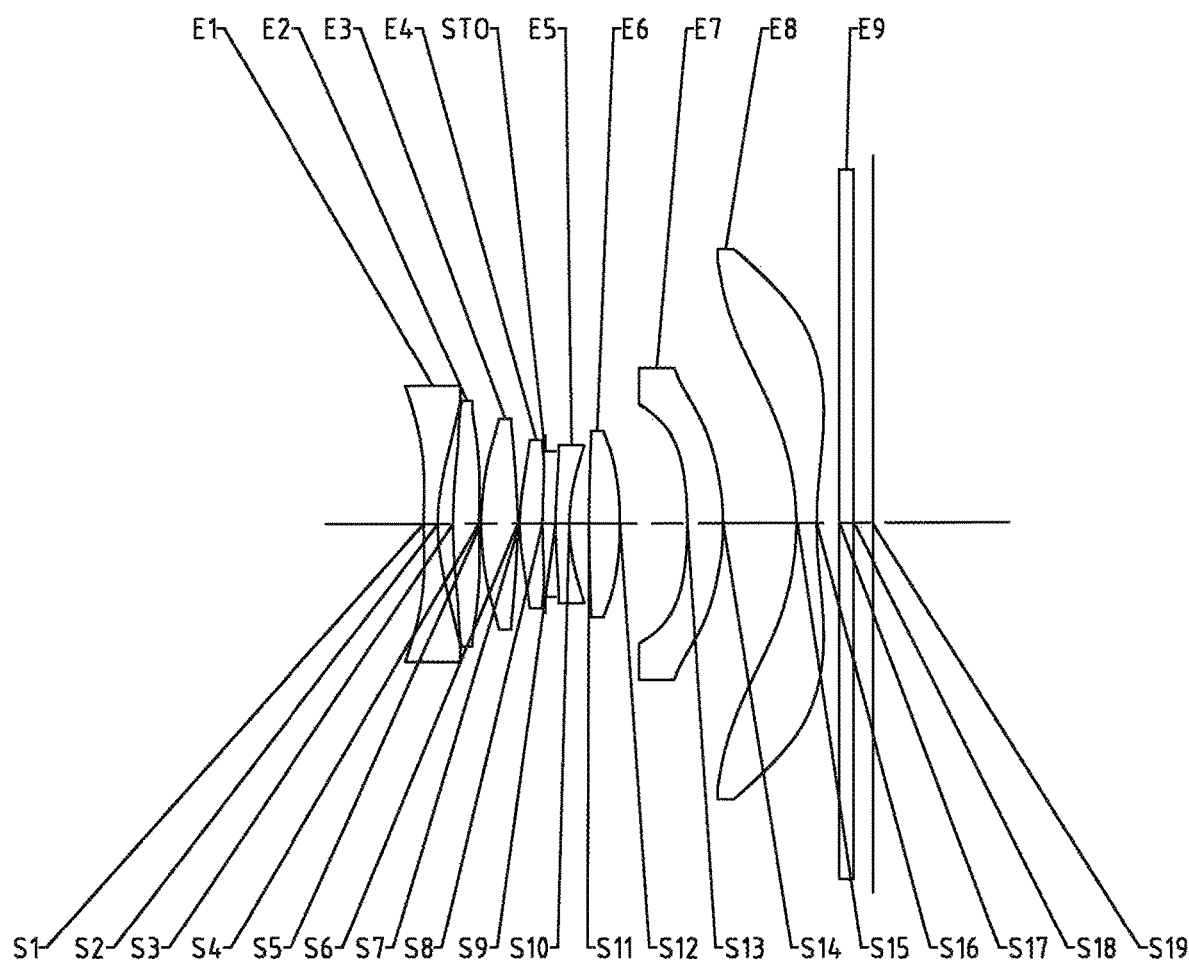
FIG. 7 illustrates a schematic structural view of an optical imaging lens assembly according to Example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a first lens E1, a second lens E2, a third lens E3, a fourth lens E4, a stop STO, a fifth lens E5, a sixth lens E6, a seventh lens E7, an eighth lens E8, an optical filter E9 and an imaging plane S19, which are sequentially arranged from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a positive refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a convex surface, and an image-side surface S12 of the sixth lens E6 is a convex surface. The seventh lens E7 has a positive refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19. Here, any one of the first lens E1 to the eighth lens E8 has a center thickness along the optical axis of less than 1 mm.

In this example, the refractive indexes of the second lens E2, the third lens E3, the fifth lens E5, and the seventh lens E7 are all set to be greater than or equal to 1.7, thereby further improving the imaging quality of the lens assembly.

Table 7 shows a table of basic parameters of the optical imaging lens assembly in example 4, wherein the units for the radius of curvature, the thickness and the focal length are millimeter (mm). Table 8 shows high-order coefficients applicable to each aspheric surface in example 4, wherein the surface shape of each aspheric surface may be defined by the formula (1) given in the above example 1.

TABLE 7

Example 4: f = 4.59 mm, TTL = 6.50 mm, ImgH = 5.30 mm, Semi-FOV = 50.5°

| Surface number | Surface type | Radius of curvature | Thickness | Material refractive index | Material abbe number | Focal length | Conic coefficient |
|---|---|---|---|---|---|---|---|
| OBJ | spherical | infinite | infinite | | | | |
| S1 | aspheric | 11.1833 | 0.2045 | 1.63 | 35.6 | −5.82 | −3.1400 |
| S2 | aspheric | 2.7693 | 0.2179 | | | | −0.0387 |
| S3 | aspheric | 7.0000 | 0.3762 | 1.73 | 46.0 | 420.69 | −8.5880 |
| S4 | aspheric | 7.0000 | 0.0300 | | | | 1.9503 |
| S5 | aspheric | 3.4421 | 0.5269 | 1.73 | 45.9 | 3.17 | 0.2015 |
| S6 | aspheric | −6.6866 | 0.0300 | | | | 2.0742 |
| S7 | aspheric | 3.0941 | 0.3286 | 1.65 | 54.4 | 8.62 | 1.5103 |
| S8 | aspheric | 6.5306 | 0.0390 | | | | 4.4581 |
| STO | spherical | infinite | 0.1488 | | | | |
| S9 | aspheric | 6.7393 | 0.2000 | 1.76 | 27.6 | −6.17 | 9.1179 |
| S10 | aspheric | 2.7303 | 0.2930 | | | | 1.0517 |
| S11 | aspheric | 30.1431 | 0.4445 | 1.49 | 70.4 | 9.01 | 55.0000 |
| S12 | aspheric | −5.1293 | 0.9731 | | | | −0.0977 |
| S13 | aspheric | −5.5313 | 0.5153 | 1.75 | 33.3 | 11.83 | 5.2246 |
| S14 | aspheric | −3.5515 | 1.0548 | | | | −11.6969 |

TABLE 7-continued

Example 4: f = 4.59 mm, TTL = 6.50 mm, ImgH = 5.30 mm, Semi-FOV = 50.5°

| Surface number | Surface type | Radius of curvature | Thickness | Material refractive index | abbe number | Focal length | Conic coefficient |
|---|---|---|---|---|---|---|---|
| S15 | aspheric | −3.8967 | 0.2968 | 1.60 | 39.0 | −3.82 | −1.0090 |
| S16 | aspheric | 5.7157 | 0.3237 | | | | −1.5843 |
| S17 | spherical | infinite | 0.2100 | 1.52 | 64.2 | | |
| S18 | spherical | infinite | 0.2869 | | | | |
| S19 | spherical | infinite | | | | | |

TABLE 8

| Surface number | A4 | A6 | A8 | A10 | A12 | A14 | A16 | A18 | A20 |
|---|---|---|---|---|---|---|---|---|---|
| S1 | −9.1933E−02 | 3.8158E−02 | −1.5752E−02 | 8.6175E−03 | −3.6658E−03 | 8.9663E−04 | −1.0755E−04 | 3.4409E−06 | 2.4886E−07 |
| S2 | −7.2089E−02 | 4.9132E−02 | −2.5731E−02 | 2.9810E−03 | 2.1801E−03 | −2.5914E−04 | −3.1871E−04 | 1.0050E−04 | −8.7430E−06 |
| S3 | −2.7351E−02 | 4.0275E−02 | −4.0968E−02 | 3.2934E−02 | −3.0663E−02 | 2.0754E−02 | −7.8253E−03 | 1.4950E−03 | −1.1378E−04 |
| S4 | −2.2480E−01 | 3.2383E−01 | −3.5466E−01 | 2.8735E−01 | −1.7135E−01 | 7.2045E−02 | −1.9756E−02 | 3.1193E−03 | −2.1283E−04 |
| S5 | −1.3370E−01 | 2.5326E−01 | −2.9640E−01 | 2.4974E−01 | −1.5335E−01 | 6.6398E−02 | −1.9719E−02 | 3.6252E−03 | −3.0028E−04 |
| S6 | 4.4358E−02 | −5.0497E−02 | 8.1231E−02 | −1.1641E−01 | 1.2489E−01 | −9.2374E−02 | 4.2884E−02 | −1.1117E−02 | 1.2339E−03 |
| S7 | −6.4117E−02 | 9.6585E−03 | 3.8707E−03 | −1.5961E−02 | 1.1294E−02 | 1.3504E−03 | −7.0468E−03 | 4.8232E−03 | −1.1884E−03 |
| S8 | −8.7908E−02 | 5.2335E−02 | −4.5314E−02 | −1.1106E−02 | 9.4119E−02 | −1.3108E−01 | 9.1512E−02 | −3.2099E−02 | 4.2845E−03 |
| S9 | −3.2543E−02 | 1.9185E−02 | −7.9072E−02 | 1.5660E−01 | −2.2297E−01 | 2.2173E−01 | −1.4278E−01 | 5.3374E−02 | −8.9925E−03 |
| S10 | −1.1337E−02 | 1.3376E−03 | −3.8038E−02 | 5.6825E−02 | −4.7492E−02 | 2.2946E−02 | −4.5226E−03 | −8.4589E−04 | 3.5701E−04 |
| S11 | −3.5511E−05 | 1.4887E−02 | −5.9549E−02 | 1.4151E−01 | −2.1748E−01 | 2.1108E−01 | −1.2546E−01 | 4.1726E−02 | −5.8985E−03 |
| S12 | −1.4713E−02 | −1.2779E−02 | 2.7929E−02 | −5.5018E−02 | 7.3314E−02 | −6.5782E−02 | 3.8000E−02 | −1.2785E−02 | 1.9367E−03 |
| S13 | −1.0871E−02 | 7.1221E−03 | −3.8156E−02 | 4.6070E−02 | −3.5024E−02 | 1.6763E−02 | −4.9192E−03 | 8.0636E−04 | −5.5536E−05 |
| S14 | −1.6681E−02 | 1.2050E−02 | −1.8419E−02 | 1.3143E−02 | −5.8506E−03 | 1.6681E−03 | −2.8526E−04 | 2.6345E−05 | −1.0088E−06 |
| S15 | 1.0717E−02 | −1.1008E−02 | 4.1509E−03 | −8.0694E−04 | 9.5175E−05 | −7.0936E−06 | 3.2791E−07 | −8.6152E−09 | 9.8589E−11 |
| S16 | −2.1702E−02 | 5.6898E−04 | 5.9769E−04 | −1.7997E−04 | 2.6711E−05 | −2.3595E−06 | 1.2378E−07 | −3.4990E−09 | 4.0261E−11 |

Figure 8A:
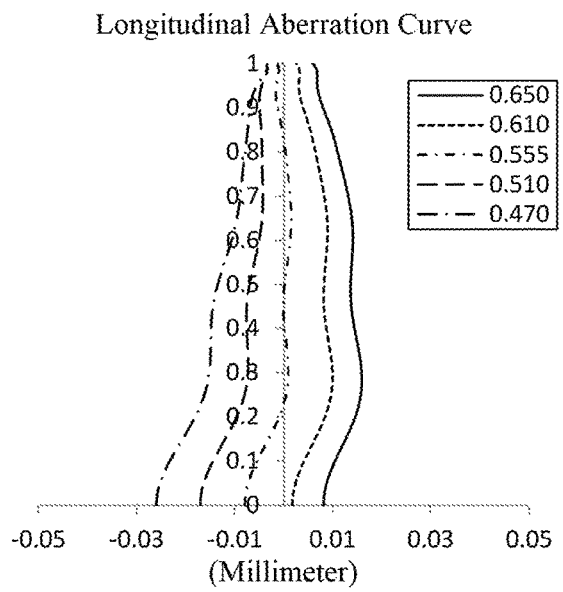
FIGS. 8A to 8D illustrate a longitudinal aberration curve, an astigmatic curve, a distortion curve and a lateral color curve of the optical imaging lens assembly of the Example 4, respectively.
Figure 8B:
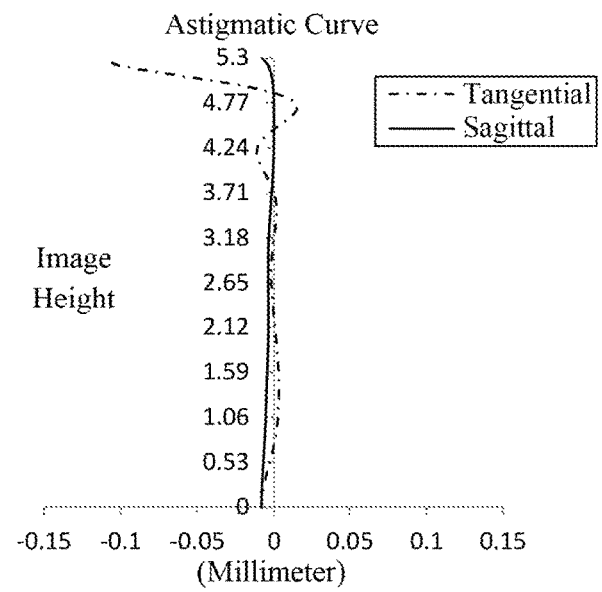
Figure 8C:
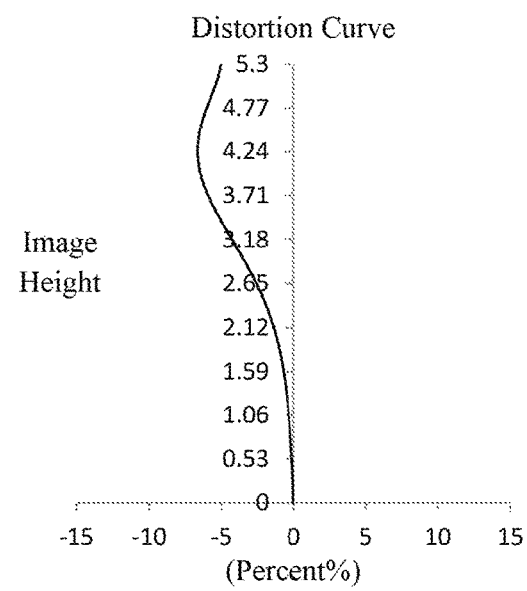
Figure 8D:
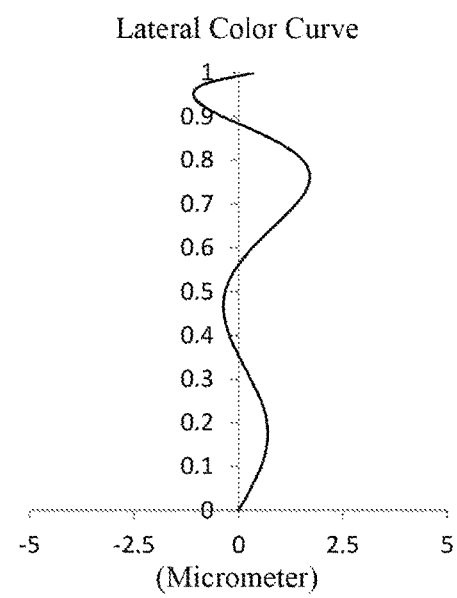

FIG. 8A illustrates a longitudinal aberration curve of the optical imaging lens assembly according to example 4, representing deviations of focal points converged by light of different wavelengths after passing through the optical imaging lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion at different image heights. FIG. 8D illustrates a lateral color curve of the optical imaging lens assembly according to example 4, representing deviations of different image heights on an imaging plane after light passes through the optical imaging lens assembly. It can be seen from FIG. 8A to FIG. 8D that the optical imaging lens assembly provided in example 4 may achieve good image quality.

EXAMPLE 5

Figure 9:
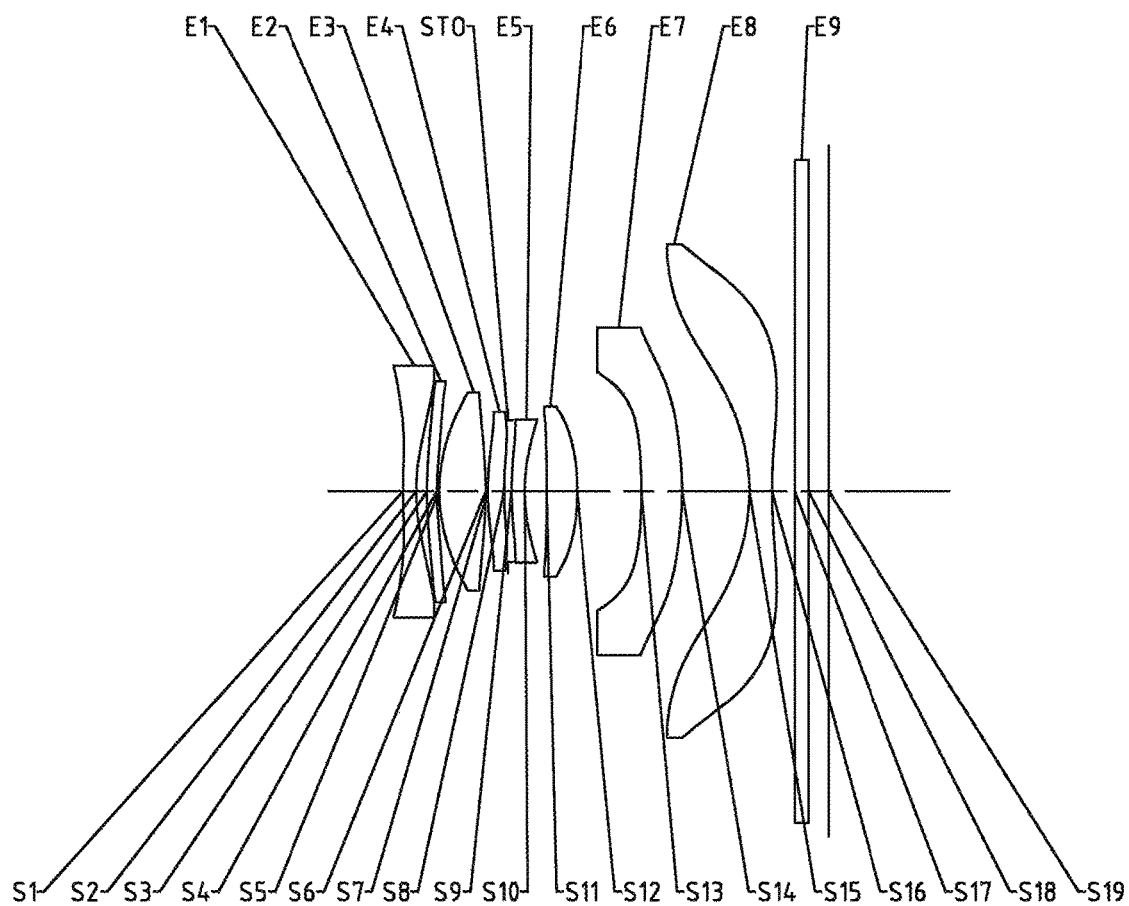
FIG. 9 illustrates a schematic structural view of an optical imaging lens assembly according to Example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a first lens E1, a second lens E2, a third lens E3, a fourth lens E4, a stop STO, a fifth lens E5, a sixth lens E6, a seventh lens E7, an eighth lens E8, an optical filter E9 and an imaging plane S19, which are sequentially arranged from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19. Here, any one of the first lens E1 to the eighth lens E8 has a center thickness along the optical axis of less than 1 mm.

In this example, the refractive indexes of the second lens E2, the third lens E3, the fifth lens E5, and the seventh lens E7 are all set to be greater than or equal to 1.7, thereby further improving the imaging quality of the lens assembly.

Table 9 shows a table of basic parameters of the optical imaging lens assembly in example 5, wherein the units for the radius of curvature, the thickness and the focal length are millimeter (mm). Table 10 shows high-order coefficients applicable to each aspheric surface in example 5, wherein the surface shape of each aspheric surface may be defined by the formula (1) given in the above example 1.

image heights. FIG. 10D illustrates a lateral color curve of the optical imaging lens assembly according to example 5, representing deviations of different image heights on an imaging plane after light passes through the optical imaging lens assembly. It can be seen from FIG. 10A to FIG. 10D that the optical imaging lens assembly provided in example 5 may achieve good image quality.

TABLE 9

Example 5: f = 4.87 mm, TTL = 6.50 mm, ImgH = 5.30 mm, Semi-FOV = 50.6°

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| S1 | aspheric | 8.2071 | 0.2000 | 1.65 | 33.5 | −6.83 | 2.5865 |
| S2 | aspheric | 2.8670 | 0.1660 | | | | −0.1139 |
| S3 | aspheric | 7.0755 | 0.1500 | 1.72 | 36.0 | −10.08 | −2.2234 |
| S4 | aspheric | 3.5514 | 0.0351 | | | | 0.8333 |
| S5 | aspheric | 2.2911 | 0.7108 | 1.74 | 45.2 | 2.23 | −0.2405 |
| S6 | aspheric | −5.1382 | 0.0300 | | | | −4.4400 |
| S7 | aspheric | 4.2000 | 0.2469 | 1.62 | 60.3 | −256.43 | 3.0129 |
| S8 | aspheric | 4.0000 | 0.0622 | | | | −2.7102 |
| STO | spherical | infinite | 0.0539 | | | | |
| S9 | aspheric | 5.0637 | 0.2000 | 1.76 | 27.6 | −9.63 | 3.9057 |
| S10 | aspheric | 2.9427 | 0.3337 | | | | 1.1254 |
| S11 | aspheric | −52.1796 | 0.4692 | 1.49 | 70.4 | 7.93 | 55.0000 |
| S12 | aspheric | −3.6191 | 0.9854 | | | | 0.9079 |
| S13 | aspheric | −8.2268 | 0.6213 | 1.76 | 27.6 | 17.27 | 7.1373 |
| S14 | aspheric | −5.2223 | 1.0266 | | | | −29.2728 |
| S15 | aspheric | −2.9767 | 0.3456 | 1.56 | 45.5 | −3.76 | −1.3011 |
| S16 | aspheric | 7.4988 | 0.3450 | | | | −3.2307 |
| S17 | spherical | infinite | 0.2100 | 1.52 | 64.2 | | |
| S18 | spherical | infinite | 0.3082 | | | | |
| S19 | spherical | infinite | | | | | |

TABLE 10

| Surface number | A4 | A6 | A8 | A10 | A12 | A14 | A16 | A18 | A20 |
|---|---|---|---|---|---|---|---|---|---|
| S1 | −7.6179E−02 | 4.1120E−03 | 2.4188E−02 | −1.7937E−02 | 7.1756E−03 | −1.8736E−03 | 3.1970E−04 | −3.2250E−05 | 1.4511E−06 |
| S2 | −4.7284E−02 | −1.9072E−02 | 6.6885E−02 | −7.8017E−02 | 5.0760E−02 | −1.9916E−02 | 4.7024E−03 | −6.1840E−04 | 3.4834E−05 |
| S3 | −4.5156E−02 | 5.2678E−02 | 1.9801E−05 | −5.5721E−02 | 5.2017E−02 | −2.2753E−02 | 5.3871E−03 | −6.4729E−04 | 2.8655E−05 |
| S4 | −2.1992E−01 | 3.0020E−01 | −2.9451E−01 | 2.0414E−01 | −1.0158E−01 | 3.5939E−02 | −8.7236E−03 | 1.3329E−03 | −9.7565E−05 |
| S5 | −1.1831E−01 | 2.0447E−01 | −2.5452E−01 | 2.3498E−01 | −1.6053E−01 | 7.9274E−02 | −2.6792E−02 | 5.3860E−03 | −4.6618E−04 |
| S6 | 7.2722E−02 | −9.3478E−02 | 1.1635E−01 | −1.2559E−01 | 1.0890E−01 | −6.7582E−02 | 2.6838E−02 | −6.0566E−03 | 6.0035E−04 |
| S7 | −5.1673E−02 | 2.4759E−02 | −2.1719E−02 | −3.5317E−02 | 1.4342E−01 | −2.0692E−01 | 1.5405E−01 | −5.8812E−02 | 9.0566E−03 |
| S8 | −1.4123E−01 | 1.6742E−01 | −2.6786E−01 | 3.1775E−01 | −2.4280E−01 | 8.7491E−02 | 1.3572E−02 | −2.2946E−02 | 5.5798E−03 |
| S9 | −2.4860E−02 | −3.3779E−02 | −2.7575E−03 | 3.9203E−02 | −5.0485E−02 | 6.3168E−02 | −6.7957E−02 | 4.1701E−02 | −1.0405E−02 |
| S10 | 5.4825E−03 | −5.8822E−02 | 6.7581E−02 | −1.0686E−01 | 1.8262E−01 | −2.0730E−01 | 1.4140E−01 | −5.3355E−02 | 8.6611E−03 |
| S11 | −1.7683E−03 | 4.6669E−03 | −4.1443E−02 | 1.0200E−01 | −1.7009E−01 | 1.7872E−01 | −1.1278E−01 | 3.7982E−02 | −4.9067E−03 |
| S12 | −1.1633E−02 | −2.9109E−02 | 9.2421E−02 | −2.1965E−01 | 3.3338E−01 | −3.2588E−01 | 1.9726E−01 | −6.7370E−02 | 9.9689E−03 |
| S13 | −2.9519E−03 | −1.1432E−02 | 2.0215E−04 | 1.2774E−03 | −1.4683E−03 | 7.7882E−04 | −2.2023E−04 | 2.5294E−05 | 1.0223E−07 |
| S14 | −5.2800E−03 | 3.9630E−03 | −7.0560E−03 | 3.8514E−03 | −1.2200E−03 | 2.4711E−04 | −3.0581E−05 | 2.0707E−06 | −5.8261E−08 |
| S15 | 1.5719E−02 | −1.2000E−02 | 3.5335E−03 | −5.3391E−04 | 5.0050E−05 | −3.1587E−06 | 1.3598E−07 | −3.6673E−09 | 4.5946E−11 |
| S16 | −1.6810E−02 | 9.0462E−04 | −1.4019E−04 | 6.8250E−05 | −1.9735E−05 | 2.9970E−06 | −2.5341E−07 | 1.1324E−08 | −2.0731E−10 |

Figure 10A:
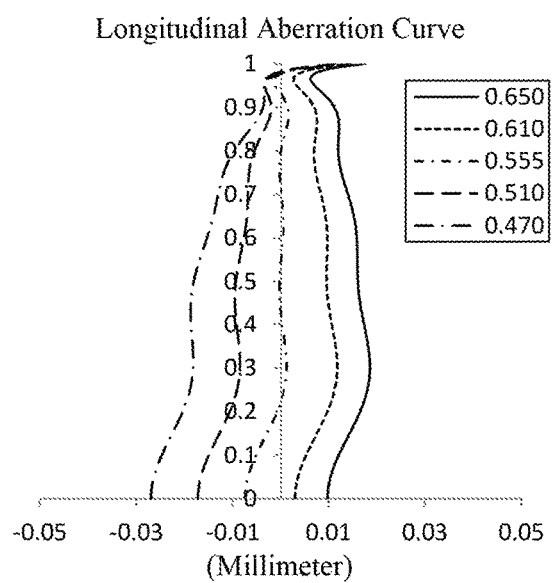
FIGS. 10A to 10D illustrate a longitudinal aberration curve, an astigmatic curve, a distortion curve and a lateral color curve of the optical imaging lens assembly of the Example 5, respectively.
Figure 10B:
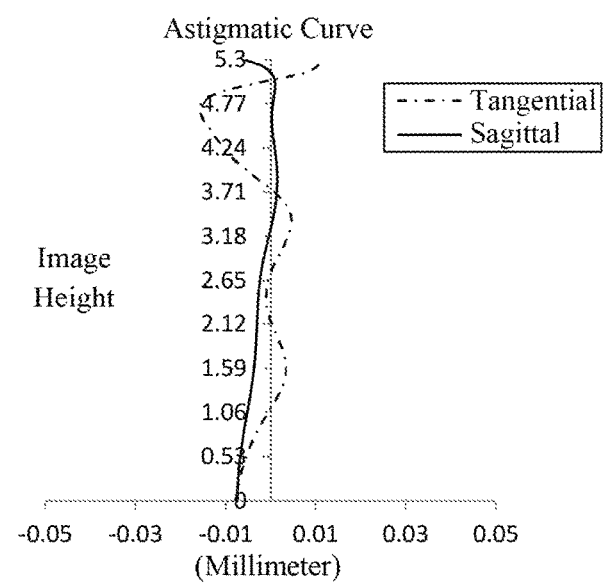
Figure 10C:
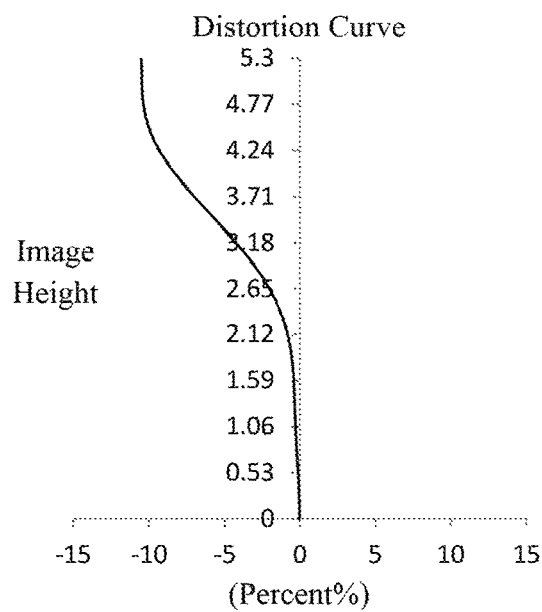
Figure 10D:
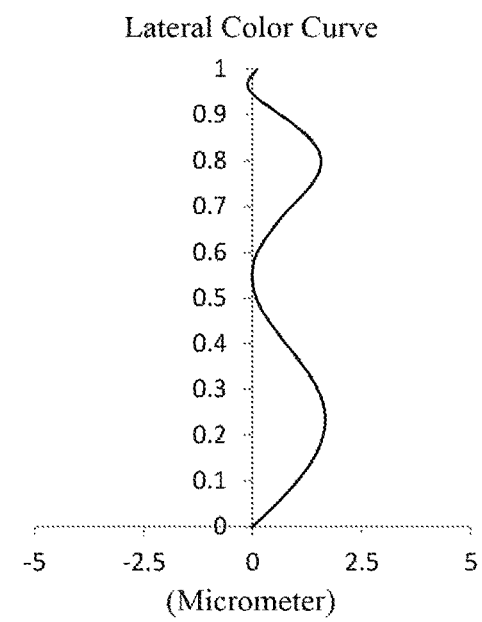

FIG. 10A illustrates a longitudinal aberration curve of the optical imaging lens assembly according to example 5, representing deviations of focal points converged by light of different wavelengths after passing through the optical imaging lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion at different

EXAMPLE 6

Figure 11:
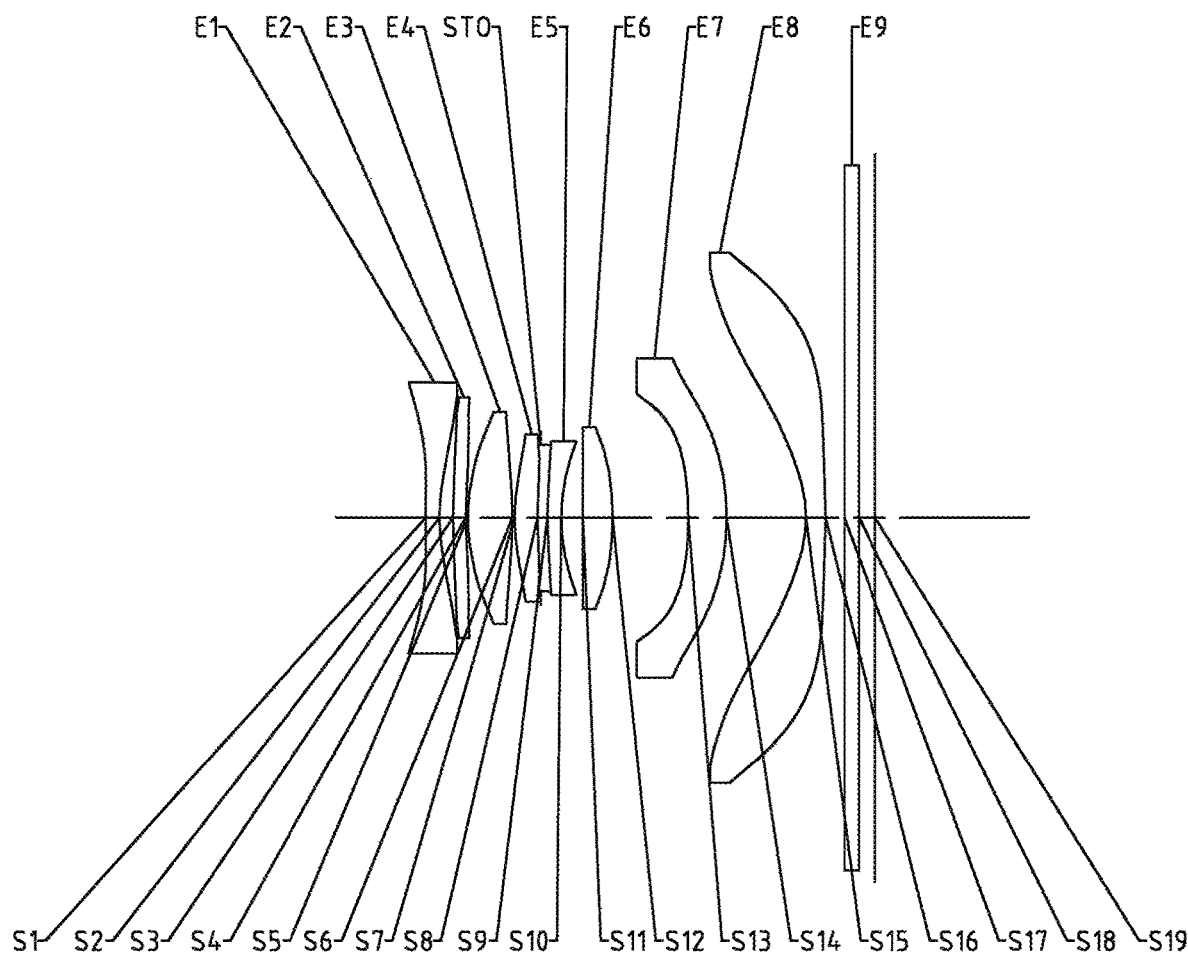
FIG. 11 illustrates a schematic structural view of an optical imaging lens assembly according to Example 6 of the present disclosure.

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a first lens E1, a second lens E2, a third lens E3, a fourth lens E4, a stop STO, a fifth lens E5, a sixth lens E6, a seventh lens E7, an eighth lens E8, an optical filter E9 and an imaging plane S19, which are sequentially arranged from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a positive refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a convex surface, and an image-side surface S12 of the sixth lens E6 is a convex surface. The seventh lens E7 has a positive refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a convex surface. The optical filter E9 has an object-side surface S17 and an image-side surface S18. Light from an object sequentially passes through the respective surfaces S1 to S18 and is finally imaged on the imaging plane S19. Here, any one of the first lens E1 to the eighth lens E8 has a center thickness along the optical axis of less than 1 mm.

In this example, the refractive indexes of the second lens E2, the third lens E3, the fifth lens E5, and the seventh lens E7 are all set to be greater than or equal to 1.7, thereby further improving the imaging quality of the lens assembly.

Table 11 shows a table of basic parameters of the optical imaging lens assembly in example 6, wherein the units for the radius of curvature, the thickness and the focal length are millimeter (mm). Table 12 shows high-order coefficients applicable to each aspheric surface in example 6, wherein the surface shape of each aspheric surface may be defined by the formula (1) given in the above example 1.

TABLE 11

Example 6: f = 4.71 mm, TTL = 6.50 mm, ImgH = 5.21 mm, Semi-FOV = 50.0°

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| S1 | aspheric | 11.0311 | 0.2030 | 1.64 | 35.6 | −6.75 | 0.9639 |
| S2 | aspheric | 3.0770 | 0.1936 | | | | −0.0304 |
| S3 | aspheric | 10.2128 | 0.1820 | 1.74 | 42.6 | −9.28 | −1.9239 |
| S4 | aspheric | 4.1004 | 0.0300 | | | | 0.6063 |
| S5 | aspheric | 2.6430 | 0.6449 | 1.74 | 45.2 | 2.58 | −0.1347 |
| S6 | aspheric | −6.2505 | 0.0321 | | | | 0.0637 |
| S7 | aspheric | 2.9892 | 0.3287 | 1.65 | 55.6 | 8.92 | 1.5033 |
| S8 | aspheric | 5.9121 | 0.0470 | | | | 4.2556 |
| STO | spherical | infinite | 0.0977 | | | | |
| S9 | aspheric | 6.2493 | 0.2000 | 1.76 | 27.6 | −6.81 | 9.3994 |
| S10 | aspheric | 2.7923 | 0.3181 | | | | 1.1625 |
| S11 | aspheric | 96.3697 | 0.4314 | 1.49 | 70.4 | 8.94 | 55.0000 |
| S12 | aspheric | −4.5706 | 1.0897 | | | | −0.8134 |
| S13 | aspheric | −5.8910 | 0.5541 | 1.76 | 27.6 | 11.58 | 5.7145 |
| S14 | aspheric | −3.6727 | 1.1447 | | | | −4.9065 |
| S15 | aspheric | −1.7834 | 0.2831 | 1.64 | 36.1 | −3.64 | −3.0544 |
| S16 | aspheric | −8.1025 | 0.2734 | | | | −3.9461 |
| S17 | spherical | infinite | 0.2100 | 1.52 | 64.2 | | |
| S18 | spherical | infinite | 0.2365 | | | | |
| S19 | spherical | infinite | | | | | |

TABLE 12

| Surface number | A4 | A6 | A8 | A10 | A12 | A14 | A16 | A18 | A20 |
|---|---|---|---|---|---|---|---|---|---|
| S1 | −8.1146E−02 | 9.8308E−03 | 1.6631E−02 | −1.2227E−02 | 4.6936E−03 | −1.2254E−03 | 2.1927E−04 | −2.3688E−05 | 1.1339E−06 |
| S2 | −5.1814E−02 | 2.5713E−03 | 3.4786E−02 | −5.2647E−02 | 3.8794E−02 | −1.6501E−02 | 4.1605E−03 | −5.8290E−04 | 3.5086E−05 |
| S3 | −4.8851E−02 | 8.0087E−02 | −7.1492E−02 | 3.4526E−02 | −1.2264E−02 | 4.5093E−03 | −1.3855E−03 | 2.4655E−04 | −1.8120E−05 |
| S4 | −2.2121E−01 | 3.0255E−01 | −3.2039E−01 | 2.5571E−01 | −1.4939E−01 | 6.0038E−02 | −1.5388E−02 | 2.2479E−03 | −1.4203E−04 |
| S5 | −1.1514E−01 | 1.9618E−01 | −2.3483E−01 | 2.1840E−01 | −1.5330E−01 | 7.6574E−02 | −2.5733E−02 | 5.1241E−03 | −4.4128E−04 |
| S6 | 3.3426E−02 | −2.0975E−02 | 2.6241E−02 | −3.8601E−02 | 4.7580E−02 | −3.8729E−02 | 1.8494E−02 | −4.7486E−03 | 5.1915E−04 |
| S7 | −6.4555E−02 | 2.9564E−02 | −4.4807E−02 | 5.7455E−02 | −6.0193E−02 | 3.9733E−02 | −1.5071E−02 | 3.4880E−03 | −5.6004E−04 |
| S8 | −8.5991E−02 | 4.0279E−02 | 8.5365E−03 | −1.3783E−01 | 2.8046E−01 | −3.1601E−01 | 2.1261E−01 | −7.9238E−02 | 1.2438E−02 |
| S9 | −3.2948E−02 | 9.0759E−03 | −2.9231E−02 | 5.0003E−02 | −9.1810E−02 | 1.3011E−01 | −1.1130E−01 | 5.1139E−02 | −9.9706E−03 |
| S10 | −8.8620E−03 | −1.5426E−02 | 3.5250E−02 | −1.1649E−01 | 2.1200E−01 | −2.2598E−01 | 1.4447E−01 | −5.1760E−02 | 7.9670E−03 |
| S11 | −3.4915E−03 | 1.9331E−02 | −6.7752E−02 | 1.4508E−01 | −2.1074E−01 | 1.9817E−01 | −1.1548E−01 | 3.7750E−02 | −5.1681E−03 |
| S12 | −1.1914E−02 | −2.9075E−02 | 9.1168E−02 | −1.8909E−01 | 2.4911E−01 | −2.1286E−01 | 1.1446E−01 | −3.5404E−02 | 4.8709E−03 |
| S13 | −1.9398E−02 | −1.2052E−02 | 1.9754E−02 | −2.2458E−02 | 1.3763E−02 | −5.1486E−03 | 1.2340E−03 | −1.8749E−04 | 1.4414E−05 |
| S14 | −1.4678E−02 | −1.7775E−03 | 5.1157E−03 | −5.0484E−03 | 2.3886E−03 | −6.0337E−04 | 8.5914E−05 | −6.5976E−06 | 2.1460E−07 |

TABLE 12-continued

| Surface number | A4 | A6 | A8 | A10 | A12 | A14 | A16 | A18 | A20 |
|---|---|---|---|---|---|---|---|---|---|
| S15 | 3.7081E−02 | −2.5433E−02 | 8.2122E−03 | −1.5552E−03 | 1.8889E−04 | −1.4931E−05 | 7.4286E−07 | −2.1121E−08 | 2.6189E−10 |
| S16 | 5.1615E−02 | −2.7704E−02 | 8.2255E−03 | −1.6162E−03 | 2.1308E−04 | −1.8623E−05 | 1.0313E−06 | −3.2621E−08 | 4.4732E−10 |

Figure 12A:
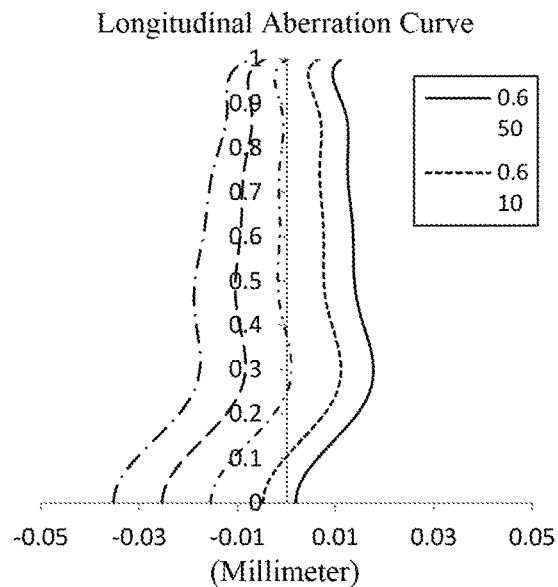
FIGS. 12A to 12D illustrate a longitudinal aberration curve, an astigmatic curve, a distortion curve and a lateral color curve of the optical imaging lens assembly of the Example 6, respectively.
Figure 12B:
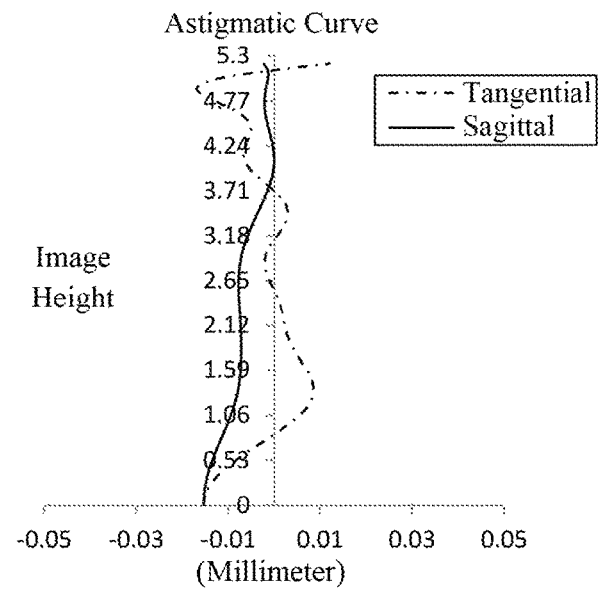
Figure 12C:
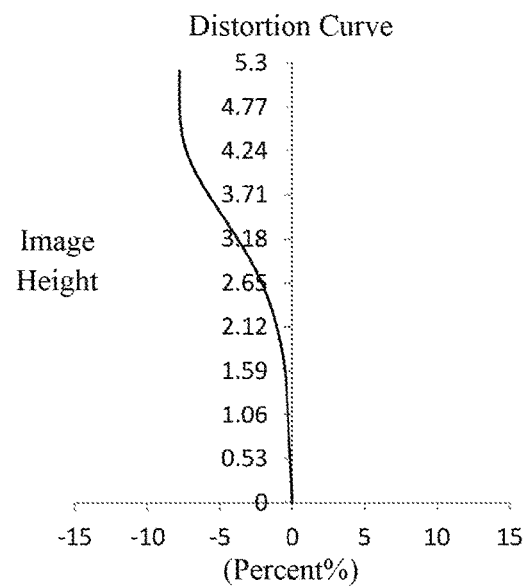
Figure 12D:
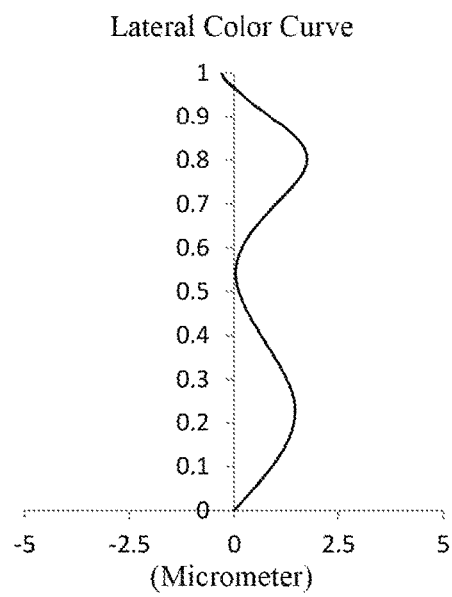

FIG. 12A illustrates a longitudinal aberration curve of the optical imaging lens assembly according to example 6, representing deviations of focal points converged by light of different wavelengths after passing through the optical imaging lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion at different image heights. FIG. 12D illustrates a lateral color curve of the optical imaging lens assembly according to example 6, representing deviations of different image heights on an imaging plane after light passes through the optical imaging lens assembly. It can be seen from FIG. 12A to FIG. 12D that the optical imaging lens assembly provided in example 6 may achieve good image quality.

EXAMPLE 7

Figure 13:
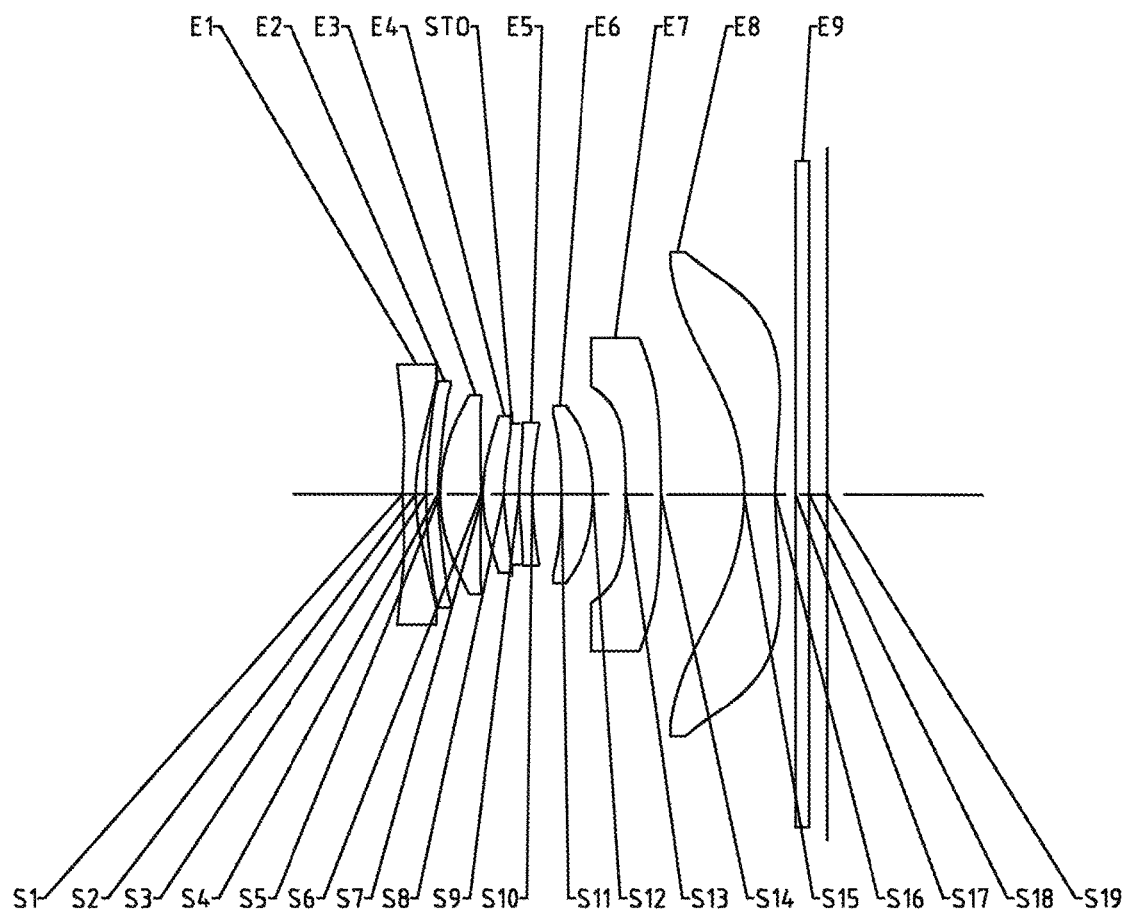
FIG. 13 illustrates a schematic structural view of an optical imaging lens assembly according to Example 7 of the present disclosure.

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly includes a first lens E1, a second lens E2, a third lens E3, a fourth lens E4, a stop STO, a fifth lens E5, a sixth lens E6, a seventh lens E7, an eighth lens E8, an optical filter E9 and an imaging plane S19, which are sequentially arranged from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a positive refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19. Here, any one of the first lens E1 to the eighth lens E8 has a center thickness along the optical axis of less than 1 mm.

In this example, the refractive indexes of the second lens E2, the third lens E3, the fifth lens E5, and the seventh lens E7 are all set to be greater than or equal to 1.7, thereby further improving the imaging quality of the lens assembly.

Table 13 shows a table of basic parameters of the optical imaging lens assembly in example 7, wherein the units for the radius of curvature, the thickness and the focal length are millimeter (mm). Table 14 shows high-order coefficients applicable to each aspheric surface in example 7, wherein the surface shape of each aspheric surface may be defined by the formula (1) given in the above example 1.

TABLE 13

Example 7: f = 4.85 mm, TTL = 6.50 mm, ImgH = 5.21 mm, Semi-FOV = 50.0°

| Surface number | Surface type | Radius of curvature | Thickness | Refractive index | Abbe number | Focal length | Conic coefficient |
|---|---|---|---|---|---|---|---|
| OBJ | spherical | infinite | infinite | | | | |
| S1 | aspheric | 6.7146 | 0.2000 | 1.67 | 32.1 | −7.10 | 3.3272 |
| S2 | aspheric | 2.7607 | 0.1589 | | | | −0.0875 |
| S3 | aspheric | 6.5635 | 0.1800 | 1.70 | 30.5 | −8.42 | 1.9914 |
| S4 | aspheric | 3.0694 | 0.0347 | | | | 0.4959 |
| S5 | aspheric | 2.3103 | 0.6239 | 1.72 | 47.2 | 2.79 | −0.1611 |
| S6 | aspheric | −13.5669 | 0.0300 | | | | 4.8261 |
| S7 | aspheric | 2.4112 | 0.3225 | 1.62 | 60.3 | 16.50 | 1.3766 |
| S8 | aspheric | 2.9894 | 0.1218 | | | | 0.5971 |
| STO | spherical | infinite | 0.1124 | | | | |
| S9 | aspheric | 5.0000 | 0.2000 | 1.76 | 27.6 | 380.77 | 0.4122 |
| S10 | aspheric | 5.0000 | 0.4453 | | | | 3.1985 |
| S11 | aspheric | −8.8912 | 0.4867 | 1.59 | 62.3 | 7.86 | 33.5159 |
| S12 | aspheric | −3.0989 | 0.5083 | | | | 0.8082 |
| S13 | aspheric | −10.2790 | 0.5375 | 1.76 | 27.6 | −57.46 | 18.0753 |
| S14 | aspheric | −13.7463 | 1.2697 | | | | −99.0000 |

TABLE 13-continued

Example 7: f = 4.85 mm, TTL = 6.50 mm, ImgH = 5.21 mm, Semi-FOV = 50.0°

| Surface number | Surface type | Radius of curvature | Thickness | Material Refractive index | Abbe number | Focal length | Conic coefficient |
|---|---|---|---|---|---|---|---|
| S15 | aspheric | −3.4300 | 0.4808 | 1.55 | 58.9 | −4.26 | −1.1192 |
| S16 | aspheric | 7.9704 | 0.3072 | | | | −0.6114 |
| S17 | spherical | infinite | 0.2100 | 1.52 | 64.2 | | |
| S18 | spherical | infinite | 0.2704 | | | | |
| S19 | spherical | infinite | | | | | |

TABLE 14

| Surface number | A4 | A6 | A8 | A10 | A12 | A14 | A16 | A18 | A20 |
|---|---|---|---|---|---|---|---|---|---|
| S1 | −7.5269E−02 | −1.4835E−03 | 2.8368E−02 | −1.8583E−02 | 6.5597E−03 | −1.4693E−03 | 2.1010E−04 | −1.7576E−05 | 6.5468E−07 |
| S2 | −4.7979E−02 | −1.8220E−02 | 6.5926E−02 | −7.7525E−02 | 5.0503E−02 | −1.9645E−02 | 4.5477E−03 | −5.7878E−04 | 3.1008E−05 |
| S3 | −6.0547E−02 | 1.0873E−02 | −9.3035E−02 | 3.9082E−02 | −1.0740E−02 | 4.2044E−03 | −1.8168E−03 | 4.3241E−04 | −4.0082E−05 |
| S4 | −2.2952E−01 | 3.4273E−01 | −4.0838E−01 | 3.5259E−01 | −2.1295E−01 | 8.7219E−02 | −2.3053E−02 | 3.5568E−03 | −2.4396E−04 |
| S5 | −1.0008E−01 | 1.9004E−01 | −2.6047E−01 | 2.4763E−01 | −1.6282E−01 | 7.4521E−02 | −2.3419E−02 | 4.5010E−03 | −3.8189E−04 |
| S6 | 5.0694E−02 | −4.2153E−02 | 4.8440E−02 | −8.8522E−02 | 1.2265E−01 | −1.0163E−01 | 4.8540E−02 | −1.2488E−02 | 1.3605E−03 |
| S7 | −4.1927E−02 | −2.6333E−02 | 1.2017E−02 | −9.4566E−02 | 1.8547E−01 | −1.8744E−01 | 1.0356E−01 | −2.8944E−02 | 3.0239E−03 |
| S8 | −7.7397E−02 | 1.8868E−02 | 3.6819E−02 | −2.5906E−01 | 5.1360E−01 | −5.5306E−01 | 3.4359E−01 | −1.1390E−01 | 1.5224E−02 |
| S9 | −3.6222E−02 | −5.3863E−04 | −9.9685E−02 | 2.8778E−01 | −5.4999E−01 | 7.0832E−01 | −5.5736E−01 | 2.4095E−01 | −4.4265E−02 |
| S10 | −1.0560E−02 | −1.6191E−02 | 1.8943E−02 | −5.3619E−02 | 1.0417E−01 | −9.0405E−02 | 4.2664E−02 | −1.3296E−02 | 2.5344E−03 |
| S11 | −6.6745E−03 | −1.0235E−02 | 3.1749E−02 | −1.0179E−01 | 1.7214E−01 | −1.6202E−01 | 8.4153E−02 | −2.1516E−02 | 2.0982E−03 |
| S12 | −1.1636E−02 | −2.9945E−02 | 4.2434E−02 | −4.9041E−02 | 3.3725E−02 | −1.4360E−02 | 5.7369E−03 | −2.8656E−03 | 7.8555E−04 |
| S13 | 7.8154E−03 | −5.5310E−02 | 7.2781E−02 | −9.7551E−02 | 9.0853E−02 | −5.4978E−02 | 2.0525E−02 | −4.2982E−03 | 3.8533E−04 |
| S14 | 2.4250E−02 | −2.3188E−02 | 8.7968E−03 | −2.4320E−03 | 5.8098E−04 | −1.1351E−04 | 1.5293E−05 | −1.1832E−06 | 3.8843E−08 |
| S15 | 8.2739E−03 | −8.5084E−03 | 3.3504E−03 | −6.6998E−04 | 8.1780E−05 | −6.3295E−06 | 3.0116E−07 | −7.8988E−09 | 8.3935E−11 |
| S16 | −1.7015E−02 | 1.8420E−03 | −7.2325E−04 | 2.7631E−04 | −6.5498E−05 | 9.0412E−06 | −7.2277E−07 | 3.1098E−08 | −5.5536E−10 |

Figure 14A:
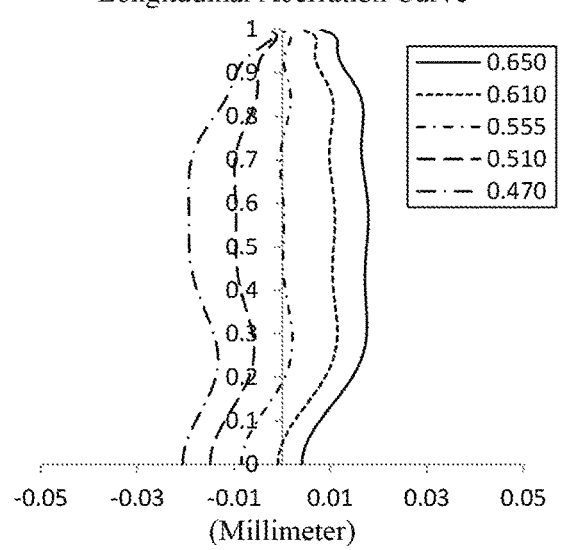
FIGS. 14A to 14D illustrate a longitudinal aberration curve, an astigmatic curve, a distortion curve and a lateral color curve of the optical imaging lens assembly of the Example 7, respectively.
Figure 14B:
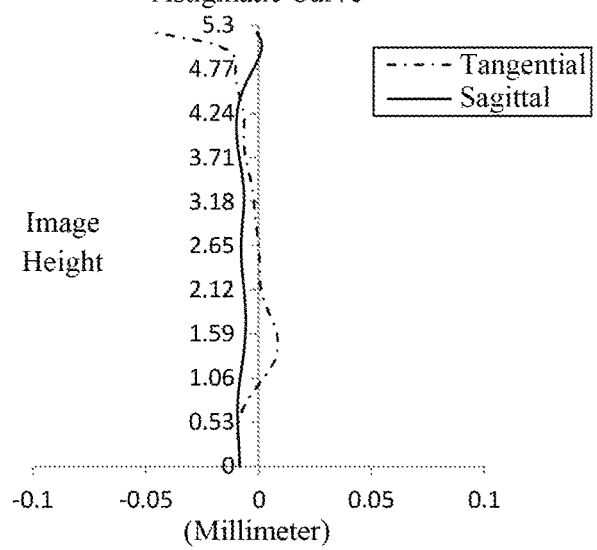
Figure 14C:
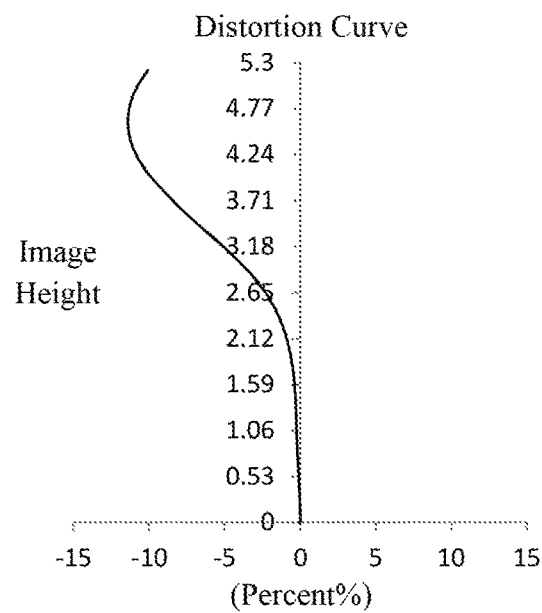
Figure 14D:
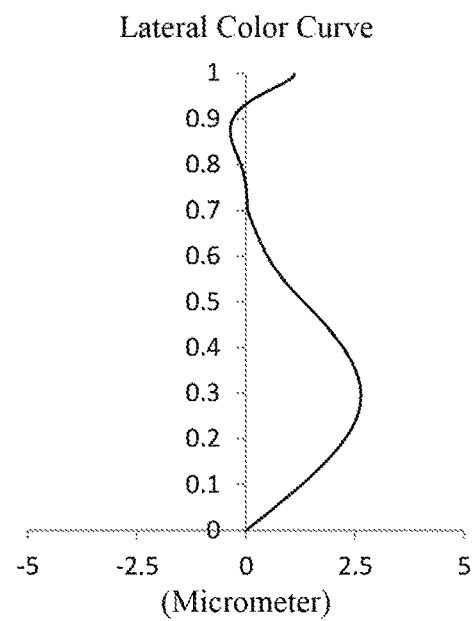

FIG. 14A illustrates a longitudinal aberration curve of the optical imaging lens assembly according to example 7, representing deviations of focal points converged by light of different wavelengths after passing through the optical imaging lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion at different image heights. FIG. 14D illustrates a lateral color curve of the optical imaging lens assembly according to example 7, representing deviations of different image heights on an imaging plane after light passes through the optical imaging lens assembly. It can be seen from FIG. 14A to FIG. 14D that the optical imaging lens assembly provided in example 7 may achieve good image quality.

EXAMPLE 8

Figure 15:
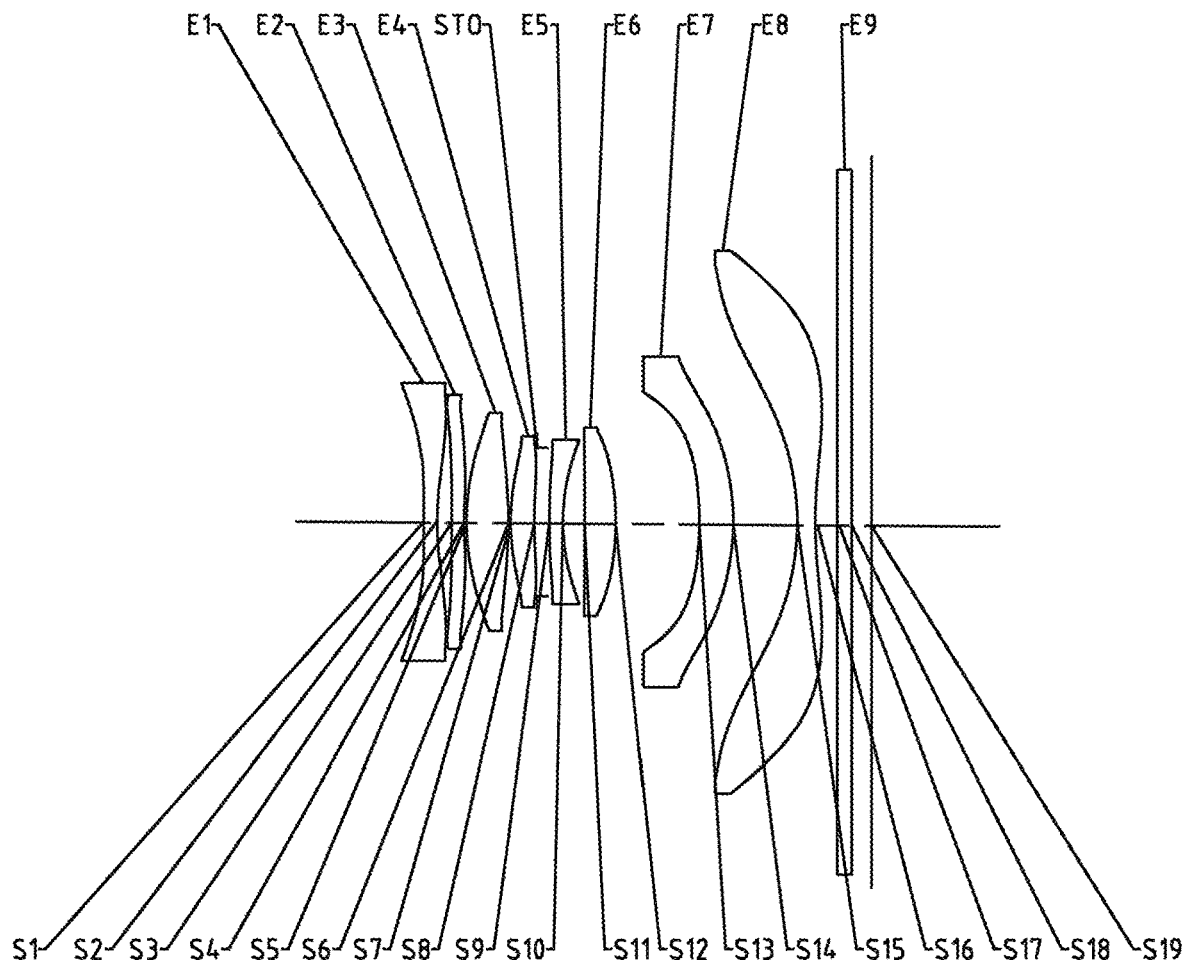
FIG. 15 illustrates a schematic structural view of an optical imaging lens assembly according to Example 8 of the present disclosure.

An optical imaging lens assembly according to example 8 of the present disclosure is described below with reference to FIG. 15 to FIG. 16D. FIG. 15 shows a schematic structural view of the optical imaging lens assembly according to example 8 of the present disclosure.

As shown in FIG. 15, the optical imaging lens assembly includes a first lens E1, a second lens E2, a third lens E3, a fourth lens E4, a stop STO, a fifth lens E5, a sixth lens E6, a seventh lens E7, an eighth lens E8, an optical filter E9 and an imaging plane S19, which are sequentially arranged from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a negative refractive power. An object-side surface S3 of the second lens E2 is a concave surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a positive refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19. Here, any one of the first lens E1 to the eighth lens E8 has a center thickness along the optical axis of less than 1 mm.

In this example, the refractive indexes of the second lens E2, the third lens E3, the fifth lens E5, and the seventh lens E7 are all set to be greater than or equal to 1.7, thereby further improving the imaging quality of the lens assembly.

Table 15 shows a table of basic parameters of the optical imaging lens assembly in example 8, wherein the units for the radius of curvature, the thickness and the focal length are millimeter (mm). Table 16 shows high-order coefficients applicable to each aspheric surface in example 8, wherein the surface shape of each aspheric surface may be defined by the formula (1) given in the above example 1.

image heights. FIG. 16D illustrates a lateral color curve of the optical imaging lens assembly according to example 8, representing deviations of different image heights on an imaging plane after light passes through the optical imaging lens assembly. It can be seen from FIG. 16A to FIG. 16D that the optical imaging lens assembly provided in example 8 may achieve good image quality.

TABLE 15

Example 8: f = 4.67 mm, TTL = 6.50 mm, ImgH = 5.21 mm, Semi-FOV = 50.0°

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| S1 | aspheric | 19.0653 | 0.2000 | 1.66 | 32.6 | −7.41 | 7.6026 |
| S2 | aspheric | 3.9092 | 0.2115 | | | | −0.0393 |
| S3 | aspheric | −1000.0000 | 0.1800 | 1.74 | 41.8 | −7.66 | −99.0000 |
| S4 | aspheric | 5.7285 | 0.0300 | | | | 1.1817 |
| S5 | aspheric | 2.8685 | 0.6128 | 1.74 | 44.9 | 2.65 | −0.2729 |
| S6 | aspheric | −5.7722 | 0.0300 | | | | −0.8767 |
| S7 | aspheric | 2.9006 | 0.3465 | 1.65 | 54.6 | 7.70 | 1.4595 |
| S8 | aspheric | 6.4951 | 0.0410 | | | | 6.5157 |
| STO | spherical | infinite | 0.1741 | | | | |
| S9 | aspheric | 7.1799 | 0.2000 | 1.76 | 27.6 | −6.66 | 13.3438 |
| S10 | aspheric | 2.9323 | 0.3179 | | | | 1.3886 |
| S11 | aspheric | −205.7290 | 0.4489 | 1.49 | 70.4 | 8.72 | −27.7434 |
| S12 | aspheric | −4.1807 | 1.2073 | | | | −1.2768 |
| S13 | aspheric | −4.8774 | 0.4935 | 1.75 | 30.2 | 11.20 | 4.0163 |
| S14 | aspheric | −3.2310 | 0.9298 | | | | −8.6483 |
| S15 | aspheric | −3.6289 | 0.2601 | 1.61 | 37.7 | −3.62 | −1.1039 |
| S16 | aspheric | 5.8241 | 0.3217 | | | | −1.8407 |
| S17 | spherical | infinite | 0.2100 | 1.52 | 64.2 | | |
| S18 | spherical | infinite | 0.2848 | | | | |
| S19 | spherical | infinite | | | | | |

TABLE 16

| Surface number | A4 | A6 | A8 | A10 | A12 | A14 | A16 | A18 | A20 |
|---|---|---|---|---|---|---|---|---|---|
| S1 | −7.9394E−02 | 1.0602E−02 | 1.8071E−02 | −1.6789E−02 | 8.6153E−03 | −2.9035E−03 | 6.1464E−04 | −7.2953E−05 | 3.6806E−06 |
| S2 | −5.2981E−02 | −3.3609E−04 | 3.8027E−02 | −4.6440E−02 | 2.6763E−02 | −8.3474E−03 | 1.4189E−03 | −1.2252E−04 | 4.3374E−06 |
| S3 | −4.0749E−02 | 4.9573E−02 | −1.8303E−02 | −1.8265E−02 | 2.1202E−02 | −9.5025E−03 | 2.3770E−03 | −3.4042E−04 | 2.2257E−05 |
| S4 | −2.2067E−01 | 2.9794E−01 | −2.9779E−01 | 2.1190E−01 | −1.0562E−01 | 3.5346E−02 | −7.3950E−03 | 8.5718E−04 | −4.0909E−05 |
| S5 | −1.2131E−01 | 2.1336E−01 | −2.5252E−01 | 2.1865E−01 | −1.3996E−01 | 6.4804E−02 | −2.0980E−02 | 4.1885E−03 | −3.7129E−04 |
| S6 | 3.7451E−02 | −3.3501E−02 | 5.7250E−02 | −8.3126E−02 | 8.5295E−02 | −5.7691E−02 | 2.3834E−02 | −5.4562E−03 | 5.4124E−04 |
| S7 | −5.4215E−02 | −6.4163E−04 | 2.3431E−02 | −5.8627E−02 | 6.8078E−02 | −4.7296E−02 | 1.8583E−02 | −3.1467E−03 | −2.1883E−05 |
| S8 | −7.0221E−02 | 2.1472E−02 | −1.4104E−02 | −1.4163E−02 | 4.3705E−02 | −5.0249E−02 | 3.2029E−02 | −1.1184E−02 | 1.6461E−03 |
| S9 | −2.4056E−02 | −7.2999E−03 | −2.4072E−02 | 9.2249E−02 | −1.5883E−01 | 1.6618E−01 | −1.0621E−01 | 3.7923E−02 | −5.8738E−03 |
| S10 | −5.6122E−03 | −1.5222E−02 | −2.1270E−03 | 3.3265E−02 | −5.9513E−02 | 5.9452E−02 | −3.5880E−02 | 1.2066E−02 | −1.7551E−03 |
| S11 | 2.5632E−03 | 7.0400E−03 | −4.1241E−02 | 9.6482E−02 | −1.4999E−01 | 1.4809E−01 | −8.9204E−02 | 2.9715E−02 | −4.1074E−03 |
| S12 | −1.0522E−02 | −1.1125E−02 | 2.9102E−02 | −6.7311E−02 | 9.7718E−02 | −9.1755E−02 | 5.3495E−02 | −1.7649E−02 | 2.5456E−03 |
| S13 | −4.9142E−03 | −5.4570E−03 | −1.4283E−03 | 1.1713E−03 | −8.3518E−04 | 4.1409E−04 | −1.1792E−04 | 1.5799E−05 | −4.6903E−07 |
| S14 | −1.3720E−02 | 4.7843E−03 | −6.1080E−03 | 3.4047E−03 | −1.2060E−03 | 2.9750E−04 | −4.5997E−05 | 3.8687E−06 | −1.3402E−07 |
| S15 | 1.3876E−02 | −1.3057E−02 | 4.7700E−03 | −9.2367E−04 | 1.1014E−04 | −8.3820E−06 | 3.9826E−07 | −1.0796E−08 | 1.2769E−10 |
| S16 | −2.2372E−02 | 1.4248E−03 | 2.1279E−04 | −7.9788E−05 | 1.0739E−05 | −7.9295E−07 | 3.1437E−08 | −4.9157E−10 | −1.3970E−12 |

Figure 16A:
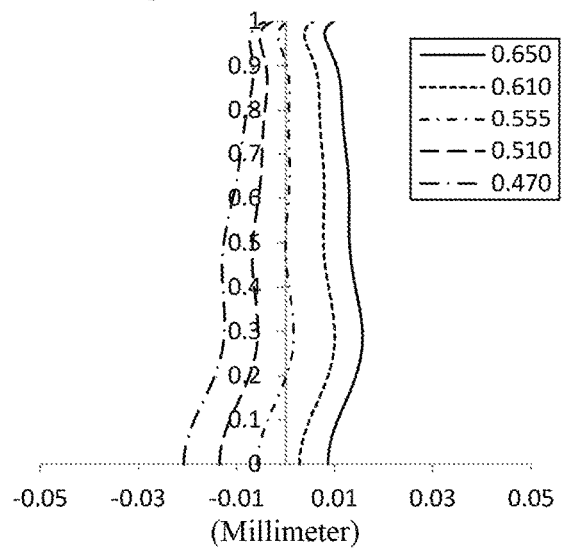
FIGS. 16A to 16D illustrate a longitudinal aberration curve, an astigmatic curve, a distortion curve and a lateral color curve of the optical imaging lens assembly of the Example 8, respectively.
Figure 16B:
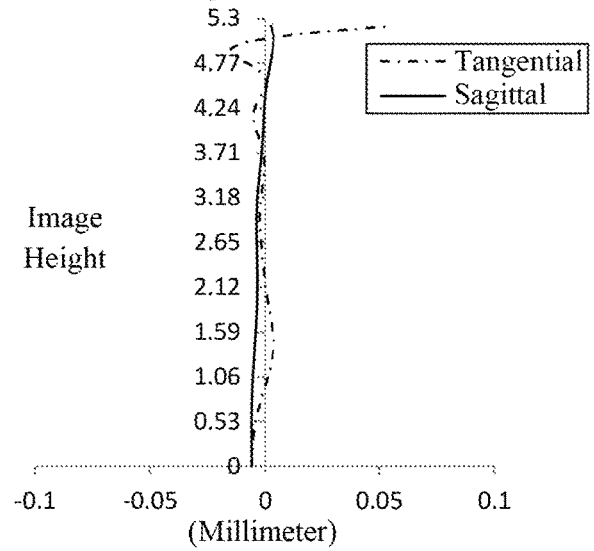
Figure 16C:
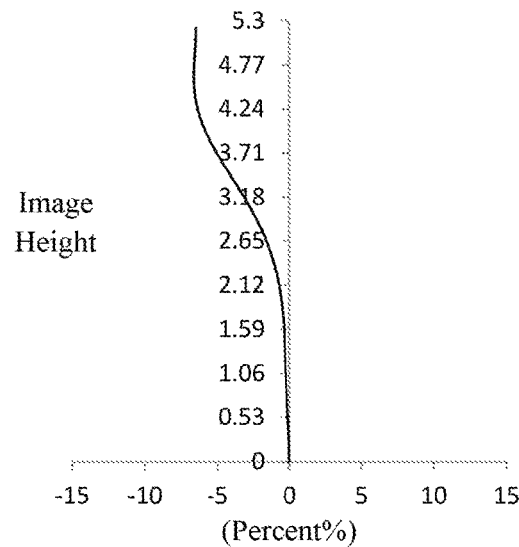
Figure 16D:
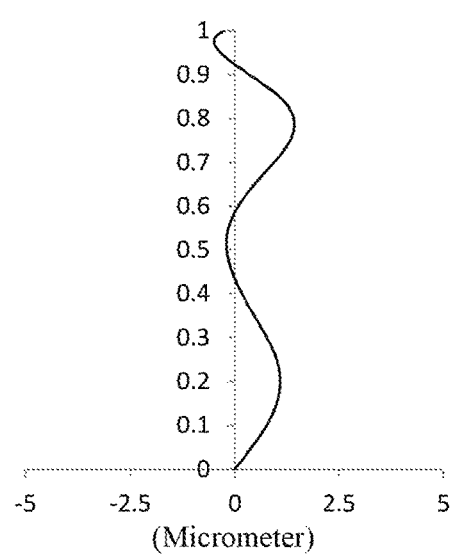

FIG. 16A illustrates a longitudinal aberration curve of the optical imaging lens assembly according to example 8, representing deviations of focal points converged by light of different wavelengths after passing through the optical imaging lens assembly. FIG. 16B illustrates an astigmatic curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion at different In view of the above, examples 1 to 8 respectively satisfy the relationship shown in Table 17.

TABLE 17

| | Example | | | | | | | |
|---|---|---|---|---|---|---|---|---|
| Condition | 1 | 2 | 3 | 4 | 5 | 6 | 7 | 8 |
| TTL/ImgH | 1.23 | 1.25 | 1.25 | 1.23 | 1.23 | 1.25 | 1.25 | 1.25 |
| f1/f8 | 1.73 | 1.96 | 1.90 | 1.52 | 1.81 | 1.86 | 1.67 | 2.05 |

TABLE 17-continued

| Condition | Example | | | | | | | |
|---|---|---|---|---|---|---|---|---|
| | 1 | 2 | 3 | 4 | 5 | 6 | 7 | 8 |
| f/f3 | 1.87 | 1.55 | 1.77 | 1.45 | 2.19 | 1.83 | 1.74 | 1.76 |
| f6/f | 1.77 | 1.69 | 1.98 | 1.96 | 1.63 | 1.90 | 1.62 | 1.87 |
| f/EPD | 2.20 | 2.20 | 2.20 | 2.20 | 2.20 | 2.20 | 2.20 | 2.20 |
| R4/R5 | 1.57 | 1.62 | 1.93 | 2.03 | 1.55 | 1.55 | 1.33 | 2.00 |
| R7/R8 | 0.53 | 0.43 | 0.43 | 0.47 | 1.05 | 0.51 | 0.81 | 0.45 |
| R9/R10 | 2.10 | 1.89 | 2.42 | 2.47 | 1.72 | 2.24 | 1.00 | 2.45 |
| (T67 + T78)/TTL | 0.33 | 0.27 | 0.33 | 0.31 | 0.31 | 0.34 | 0.27 | 0.33 |
| ImgH (mm) | 5.30 | 5.21 | 5.21 | 5.30 | 5.30 | 5.21 | 5.21 | 5.21 |
| Semi-FOV (°) | 50.6 | 50.0 | 50.0 | 50.5 | 50.6 | 50.0 | 50.0 | 50.0 |

The present disclosure further provides an imaging apparatus, having a photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising: a first lens, a second lens, a third lens, a fourth lens, a fifth lens, a sixth lens, a seventh lens and an eighth lens, which have refractive power and are sequentially arranged from an object side to an image side of the optical imaging lens assembly along an optical axis,
    wherein,
    the first lens has a negative refractive power;
    each of the third lens and the sixth lens has a positive refractive power;
    an object-side surface of the fourth lens is a convex surface, and an image-side surface of the fourth lens is a concave surface;
    an object-side surface of the fifth lens is a convex surface, and an image-side surface of the fifth lens is a concave surface; and
    wherein TTL/ImgH≤1.25, where TTL is a distance along the optical axis from an object-side surface of the first lens to an imaging plane of the optical imaging lens assembly, and ImgH is half of a diagonal length of an effective pixel area on the imaging plane of the optical imaging lens assembly, and
    wherein 1.4<f/f3<2.5, where f is a total effective focal length of the optical imaging lens assembly and f3 is an effective focal length of the third lens.

2. The optical imaging lens assembly according to claim 1, wherein 1.5<f6/f<2.0,
    where f6 is an effective focal length of the sixth lens and f is a total effective focal length of the optical imaging lens assembly.

3. The optical imaging lens assembly according to claim 1, wherein f/EPD<2. 5,
    where f is a total effective focal length of the optical imaging lens assembly and EPD is an entrance pupil diameter of the optical imaging lens assembly.

4. The optical imaging lens assembly according to claim 1, wherein 0<R7/R8<1.5,
    where R7 is a radius of curvature of the object-side surface of the fourth lens and R8 is a radius of curvature of the image-side surface of the fourth lens.

5. The optical imaging lens assembly according to claim 1, wherein 1≤R9/R10<2.5,
    where R9 is a radius of curvature of the object-side surface of the fifth lens and R10 is a radius of curvature of the image-side surface of the fifth lens.

6. The optical imaging lens assembly according to claim 1, wherein 1.0<R4/R5<2.5,
    where R4 is a radius of curvature of an image-side surface of the second lens and R5 is a radius of curvature of an object-side surface of the third lens.

7. The optical imaging lens assembly according to claim 1, wherein 0<(T67+T78)/TTL<0.5,
    where T67 is an air interval between the sixth lens and the seventh lens along the optical axis, T78 is an air interval between the seventh lens and the eighth lens along the optical axis, and TTL is the distance along the optical axis from the object-side surface of the first lens to the imaging plane of the optical imaging lens assembly.

8. The optical imaging lens assembly according to claim 1, wherein at least three lenses among the first lens to the eighth lens have a refractive index greater than or equal to 1.7.

9. The optical imaging lens assembly according to claim 1, wherein any one of the first lens to the eighth lens has a center thickness of less than 1 mm along the optical axis.

10. An optical imaging lens assembly, comprising: a first lens, a second lens, a third lens, a fourth lens, a fifth lens, a sixth lens, a seventh lens and an eight eighth lens, which have refractive power and are sequentially arranged from an object side to an image side of the optical imaging lens assembly along an optical axis,
    wherein,
    the first lens has a negative refractive power;
    each of the third lens and the sixth lens has a positive refractive power;
    an object-side surface of the fourth lens is a convex surface, and an image-side surface of the fourth lens is a concave surface;
    an object-side surface of the fifth lens is a convex surface, and an image-side surface of the fifth lens is a concave surface; and
    wherein 1.5<f1/f8<2.5, where f1 is an effective focal length of the first lens and f8 is an effective focal length of the eighth lens, and
    wherein 1.4<f/f3<2.5, where f is a total effective focal length of the optical imaging lens assembly and f3 is an effective focal length of the third lens.

11. The optical imaging lens assembly according to claim 10, wherein 1.5<f6/f<2.0,
    where f6 is an effective focal length of the sixth lens and f is a total effective focal length of the optical imaging lens assembly.

12. The optical imaging lens assembly according to claim 10, wherein f/EPD<2.5,
    where f is a total effective focal length of the optical imaging lens assembly and EPD is an entrance pupil diameter of the optical imaging lens assembly.

13. The optical imaging lens assembly according to claim 10, wherein 0<R7/R8<1.5,
where R7 is a radius of curvature of the object-side surface of the fourth lens and R8 is a radius of curvature of the image-side surface of the fourth lens.

14. The optical imaging lens assembly according to claim 10, wherein 1≤R9/R10<2.5,
where R9 is a radius of curvature of the object-side surface of the fifth lens and R10 is a radius of curvature of the image-side surface of the fifth lens.

15. The optical imaging lens assembly according to claim 10, wherein 1.0<R4/R5<2.5,
where R4 is a radius of curvature of an image-side surface of the second lens and R5 is a radius of curvature of an object-side surface of the third lens.

16. The optical imaging lens assembly according to claim 10, wherein 0<(T67+T78)/TTL<0.5,
where T67 is an air interval between the sixth lens and the seventh lens along the optical axis, T78 is an air interval between the seventh lens and the eighth lens along the optical axis, and TTL is a distance along the optical axis from an object-side surface of the first lens to an imaging plane of the optical imaging lens assembly.

17. The optical imaging lens assembly according to claim 10, wherein ImgH>5 mm,
where ImgH is half of a diagonal length of an effective pixel area on an imaging plane of the optical imaging lens assembly.

18. The optical imaging lens assembly according to claim 10, wherein Semi-HFOV≥50°,
where Semi-FOV is half of a maximal field-of-view of the optical imaging lens assembly.

* * * * *